United States Patent
Li et al.

(10) Patent No.: US 11,886,422 B1
(45) Date of Patent: *Jan. 30, 2024

(54) TRANSACTIONAL PROTOCOL FOR SNAPSHOT ISOLATION WITHOUT SYNCHRONIZED CLOCKS

(71) Applicant: Amazon Technologies, Inc., Seattle, WA (US)

(72) Inventors: Bohou Li, Sunnyvale, CA (US); Vijayan Prabhakaran, Los Gatos, CA (US); Mehul A. Shah, Saratoga, CA (US); Benjamin Sowell, San Mateo, CA (US); Douglas Brian Terry, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,347

(22) Filed: Mar. 29, 2021

(51) Int. Cl.
  *G06F 16/23* (2019.01)
  *G06F 16/245* (2019.01)
  *G06F 16/21* (2019.01)
  *G06F 16/22* (2019.01)

(52) U.S. Cl.
  CPC ........ *G06F 16/2379* (2019.01); *G06F 16/219* (2019.01); *G06F 16/2282* (2019.01); *G06F 16/2343* (2019.01); *G06F 16/245* (2019.01)

(58) Field of Classification Search
  CPC ............... G06F 16/219; G06F 16/2282; G06F 16/2343; G06F 16/2379; G06F 16/245
  See application file for complete search history.

(56) References Cited

U.S. PATENT DOCUMENTS

| | | | |
|---|---|---|---|
| 5,642,503 A * | 6/1997 | Reiter | G06F 16/2329 |
| 5,701,480 A | 12/1997 | Raz | |
| 7,305,419 B1 | 12/2007 | Cosby et al. | |
| 7,827,144 B1 * | 11/2010 | Saito | G06F 16/2322 |
| | | | 707/638 |
| 10,466,924 B1 | 11/2019 | Newstadt et al. | |
| 10,671,639 B1 | 6/2020 | Acheson et al. | |
| 10,860,550 B1 | 12/2020 | Chheda et al. | |
| 10,983,981 B1 * | 4/2021 | Sharma | G06F 16/2365 |
| 11,061,652 B1 | 7/2021 | Biswas et al. | |
| 11,599,514 B1 * | 3/2023 | Agrawal | G06F 16/2282 |
| 2003/0236786 A1 * | 12/2003 | Shi | G06F 16/2315 |
| 2008/0228795 A1 | 9/2008 | Lomet | |
| 2009/0070330 A1 * | 3/2009 | Hwang | G06F 16/2477 |
| 2012/0011106 A1 | 1/2012 | Reid et al. | |

(Continued)

OTHER PUBLICATIONS

Non-Final Office Action, U.S. Appl. No. 17/216,326, dated May 27, 2022, 20 pages.

(Continued)

*Primary Examiner* — James E Richardson
(74) *Attorney, Agent, or Firm* — Nicholson De Vos Webster & Elliott LLP

(57) ABSTRACT

A protocol for implementing ACID transactions that provides snapshot isolation in a distributed setting that does not require synchronized clocks is described. The protocol ensures at commit time that transactions touching common objects do not commit out of order. The protocol can be used in the context of a distributed data lake built on an object store in which clients can transactionally add or remove objects from logical tables.

20 Claims, 18 Drawing Sheets

(56) References Cited

U.S. PATENT DOCUMENTS

| | | |
|---|---|---|
| 2012/0209822 A1 | 8/2012 | Prabhakar et al. |
| 2012/0324472 A1 | 12/2012 | Rossbach et al. |
| 2013/0060742 A1* | 3/2013 | Chang ................. G06F 16/1774 707/704 |
| 2013/0198435 A1 | 8/2013 | Sandadi et al. |
| 2014/0337393 A1* | 11/2014 | Burchall ............. G06F 16/2379 707/826 |
| 2015/0378774 A1* | 12/2015 | Vermeulen .............. G06F 9/466 707/613 |
| 2016/0283890 A1 | 9/2016 | Diehl |
| 2016/0314161 A1 | 10/2016 | Wen et al. |
| 2016/0371356 A1 | 12/2016 | Lee et al. |
| 2017/0300552 A1 | 10/2017 | Mandadi et al. |
| 2018/0322158 A1* | 11/2018 | Zhang ................. G06F 16/2343 |
| 2018/0349430 A1 | 12/2018 | Lee et al. |
| 2019/0129893 A1 | 5/2019 | Baird et al. |
| 2020/0012619 A1 | 1/2020 | Gupta et al. |
| 2020/0073981 A1 | 3/2020 | Pilkington et al. |
| 2020/0151166 A1 | 5/2020 | Shekhar et al. |
| 2020/0210519 A1 | 7/2020 | Wang et al. |
| 2021/0334258 A1 | 10/2021 | Ofenloch |

OTHER PUBLICATIONS

Non-Final Office Action, U.S. Appl. No. 17/216,359, dated Jun. 29, 2022, 20 pages.

Non-Final Office Action, U.S. Appl. No. 17/216,373, dated Oct. 13, 2022, 19 pages.

Notice of Allowance, U.S. Appl. No. 17/216,359, dated Feb. 28, 2023, 24 pages.

Notice of Allowance, U.S. Appl. No. 17/216,373, dated Mar. 13, 2023, 7 pages.

Notice of Allowance, U.S. Appl. No. 17/216,326, dated Nov. 7, 2022, 9 pages.

\* cited by examiner

400

BeginTransaction(ReadOnly = false) - returns a transaction ID (txId)

CommitTransaction(txId) - commits all updates

AbortTransaction(txId) - undoes any updates

ExtendtTransaction(txId) - Indicate that the specified transaction is still active and should not be treated as idle and aborted GetTransaction(txnId) - Returns the status of a single transaction GetTransactions(CatalogId = accountId, StatusFilter = ALL, MaxResults = "", NextToken = "") - Returns metadata about transactions and their status.

450

GetTableObjects(CatalogID = accountId, DatabaseName, TableName, TransactionId = "", QueryTime = "", PartitionPredicate = "", MaxResults = "", NextToken = "") – returns a set of data objects that make up a specified table UpdateTableObjects(CatalogID = accountId, DatabaseName, TableName, TransactionId = "", WriteOperations) – Updates data objects that make up the specified table GetChangedTableObjects(StartTransactionId, EndTransactionId = lastTxnId, CatalogID = accountId, DatabaseName, TableName,MaxResults = "", NextToken = "")

*FIG. 4*

CreateSet(txId, setId, setMetadata) - creates a new set with optional metadata

DestroySet(txId, setId) - deletes the set

AddElement(txId, setId, elementId, elementMetadata) - adds an element to the set RemoveElement(txId, setId, elementId) - removes an element from the set AddSetElement(txId, parentId, childId) - adds a set element UpdateSetMetadata(txId, setId, setMetadata) - updates the set's metadata UpdateElementData(txId, setId, elementId, elementMetadata) - updates the element's metadata GetElement(txId, setId, elementId, asof) - returns the associated metadata for the "asof" version GetAllElements(txId, setId, asof) - returns all elements of the set for the "asof" version GetRangeOfElements(txId, setId, minElementId, maxElementId, asof) - returns elements in the range

RECEIVE A REQUEST TO COMMIT A TRANSACTION, WHEREIN THE TRANSACTION INCLUDES AN UPDATE TO DATA OF A TABLE 1402

↓

GENERATE, BASED ON A FIRST TREE DATA STRUCTURE STORING METADATA ASSOCIATED WITH A FIRST VERSION OF THE TABLE, A SECOND TREE DATA STRUCTURE ASSOCIATED WITH A SECOND VERSION OF THE TABLE RESULTING FROM THE TRANSACTION BEING PERFORMED UPON THE FIRST VERSION, WHEREIN THE FIRST TREE DATA STRUCTURE AND THE SECOND TREE DATA STRUCTURE EACH INCLUDE ONE OR MORE NODES THAT DO NOT EXIST IN THE OTHER DATA STRUCTURE, AND WHEREIN THE SECOND TREE DATA STRUCTURE REFERENCES ONE OR MORE NODES OF THE FIRST TREE DATA STRUCTURE 1404

↓

UPDATE A VERSION HISTORY DATA STRUCTURE ASSOCIATED WITH THE TABLE TO INCLUDE A SECOND VERSION NODE ASSOCIATED WITH THE SECOND VERSION, WHEREIN THE SECOND VERSION NODE REFERENCES THE SECOND TREE DATA STRUCTURE AND FURTHER REFERENCES A FIRST VERSION NODE ASSOCIATED WITH THE FIRST VERSION 1406

FIG. 14

TRANSACTIONAL PROTOCOL FOR SNAPSHOT ISOLATION WITHOUT SYNCHRONIZED CLOCKS

BACKGROUND

Today, many users and organizations build data lakes to break down data silos, centralize data assets, and unlock the potential of their data. Many of these users use data lake management services to simplify data lake setup, security, and management. For example, users may use services that can model their data objects as tables with semi-structured data, centrally define security policies on tables and their columns, and securely analyze the data through a wide variety of analytics and ML services.

As these users look to leverage data lakes for an increasing variety of purposes, they want granular control over how data is updated and accessed—like they have with data warehouses today. For example, to load streaming data or quickly incorporate changes from source data systems, customers need to insert, delete, and modify rows across multiple tables in parallel. At the same time, to support real-time analytics and ML, they need to run queries that return consistent and up-to-date data. To meet these needs today, users write and maintain complex and error-prone application code to manage concurrent updates and ensure queries return accurate results. Existing systems do not support transactions across multiple tables, have difficulty scaling, and may only work with a narrow set of open-source analytics engines.

Moreover, many users seek to perform "time travel" based analysis of their data. For example, time travel is increasingly an important part of the data governance and compliance needs for many organizations. Time travel enables accessing historical data as of a specific time, within some defined window. Time travel is typically required to support audits (in case of audits customers often need to run/rerun a report as of a specific time), restoring data (in case of accidental or malicious deletions), backup (to create snapshots/backups for a specific time such as midnight every night), etc.

BRIEF DESCRIPTION OF DRAWINGS

Various embodiments in accordance with the present disclosure will be described with reference to the drawings, in which:

FIG. 4 is a diagram illustrating exemplary public application programming interface functions provided by an interface of a transactional access manager for enabling transactional data lake support according to some embodiments.

FIG. 9 is a diagram illustrating exemplary application programming interface methods for creating, destroying, and updating t-sets according to some embodiments.

FIG. 14 is a flow diagram illustrating operations of a method for providing transactional access to a data lake with snapshot isolation using a version history data structure and tree data structures according to some embodiments.

DETAILED DESCRIPTION

Figure 1:
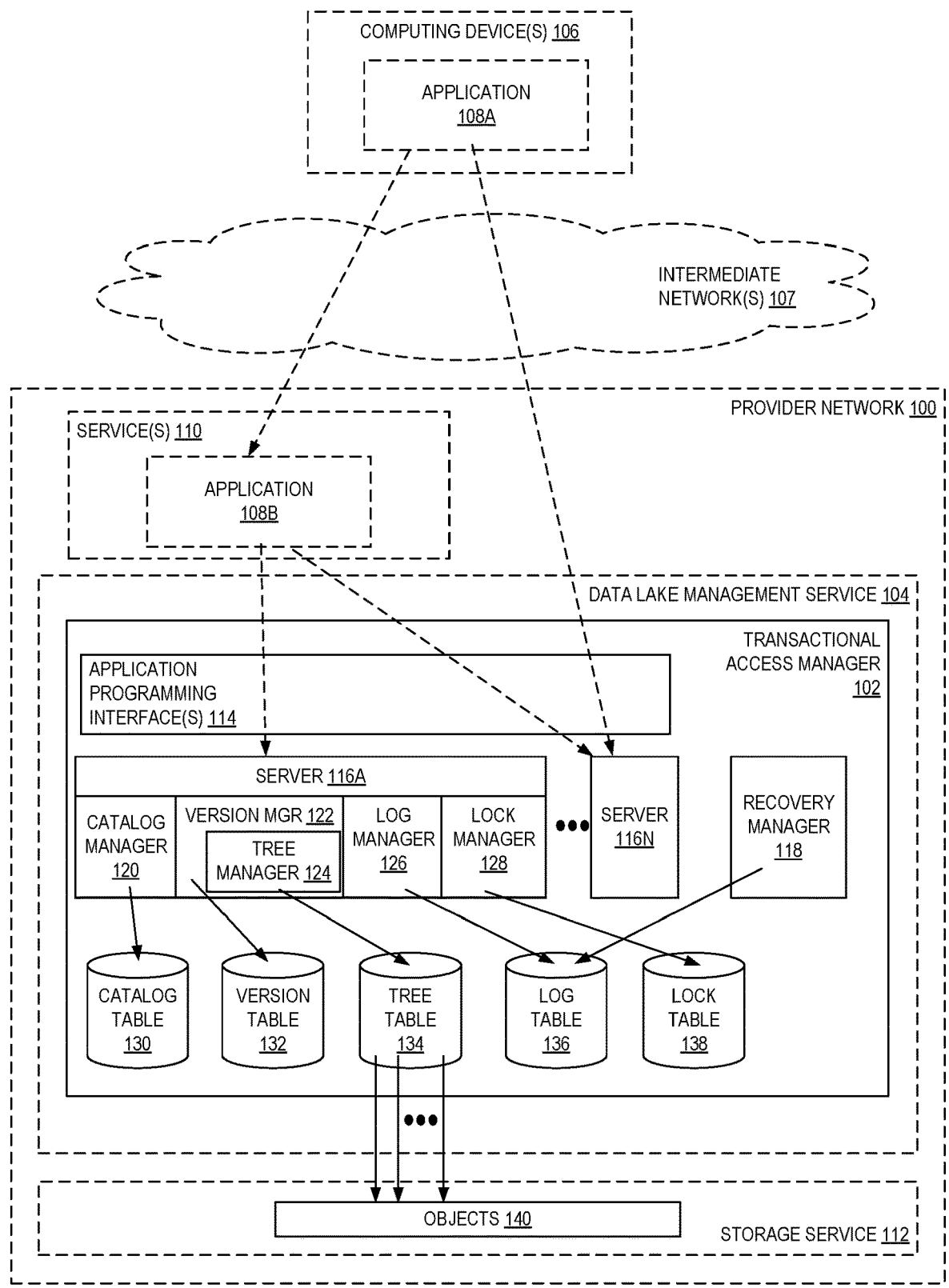
FIG. 1 is a diagram illustrating an environment including a transactional access manager of a data lake management system for implementing a governed storage interface providing transactional support for concurrent modifications to objects in a data lake according to some embodiments.

The present disclosure relates to methods, apparatus, systems, and non-transitory computer-readable storage media for implementing transactional support for data stored in systems such as data lakes. According to some embodiments, a transactional version set can be used to serve as a fundamental abstraction, e.g., for implementing catalog metadata of various types. Data structures following the transactional version set organization can be efficiently stored, provide fast access to requested data, and allow for potentially parallel transactional access to the data with atomicity while ensuring isolation, optionally avoiding the need for locking. The transactional version set, in some embodiments, can be implemented in a hierarchical manner to provide a single representation used for multiple types of catalog entities and operations, simplifying the logic and complexity of a system. In some embodiments, transactional version sets can be used to implement a consistent data catalog, which maintains metadata about the databases, tables, partitions, and files that make up a distributed data management system such as a data lake.

In some embodiments, transactional version set inspired organizations can be utilized with a protocol for implementing atomic, consistent, isolated, and durable (ACID) transactions that provide snapshot isolation in a distributed setting. Snapshot isolation is commonly used in databases, but most implementations rely on a centralized clock or sequence number generator, which can become a bottleneck in distributed environments. In some embodiments, a protocol and implementation may not require synchronized clocks, e.g., by ensuring at commit time that transactions touching common objects do not commit out of order. In some embodiments, this protocol is implemented in the context of a distributed data lake built on an object storage service in which clients can transactionally add or remove objects from logical tables.

In some embodiments, an architecture constructed using transactional version set concepts may include the use of tree data structures, such as B-Trees, to maintain a transactionally consistent set with support for time-travel queries. In some embodiments, when a transaction commits, a new version of a tree is created using a copy-on-write based approach that shares internal nodes (with trees corresponding to earlier versions) to save space. In some embodiments, this approach is implemented in a transactional data catalog in which the files that make up a table are stored in a transactional set.

Embodiments disclosed herein provide a storage API in a data lake management service that provides ACID transactions for data lakes on a distributed object storage service. The data lake management service, which makes it easy to setup, secure, and manage data lakes, allows users to organize data (e.g., stored elsewhere, such as in storage locations provided by a distributed object storage service) into tables made up of rows that can include structured or semi-structured data. The storage API, provided by a transactional access manager, allows multiple users to concurrently and reliably insert, delete, and modify rows across these tables, making it easy, for example, to keep data lakes continuously up-to-date while simultaneously running analytics queries and machine learning (ML) that return consistent and real-time results. Users can build analytics applications that directly read from and write to their data lakes through the transactional access manager's public APIs. Also, customers can query their data lakes through analytics and/or machine learning services that utilize these (or similar) interfaces.

FIG. 1 is a diagram illustrating an environment including a transactional access manager of a data lake management system for implementing a governed storage interface providing transactional support for concurrent modifications to objects in a data lake according to some embodiments. The transactional access manager 102 may be implemented as part of a data lake management service 104, e.g., and may be implemented as software executed by one or more computing devices in one or more geographic or physical locations.

A data lake management service 104, in some embodiments, is a service that makes it easy for users to set up a secure data lake. A data lake is typically a logically centralized, curated, and secured repository that stores all your data, both in its original form and prepared for analysis. A data lake enables users to, for example, break down data silos and combine different types of analytics to gain insights and guide better business decisions. Traditionally, setting up and managing data lakes involves a lot of manual, complicated, and time-consuming tasks, such as loading data from diverse sources, monitoring those data flows, setting up partitions, turning on encryption and managing keys, defining transformation jobs and monitoring their operation, re-organizing data into a columnar format, configuring access control settings, deduplicating redundant data, matching linked records, granting access to data sets, auditing access over time, etc. The data lake management service 104, however, may allow users to simply define data sources and what data access and security policies are to be applied, and then the system collects and catalogs data from databases and object storage, move the data into a data lake (e.g., into one or more storage locations of a storage service such as an object storage service), clean and classify the data using machine learning algorithms, secure access to the data, etc. The data lake management service 104 may also provide users access to a centralized data catalog that describes available data sets and their appropriate usage and allow users to use these data sets with a variety of applications such as analytics and machine learning services.

The data lake management service 104, in some embodiments, is implemented in one or more regions of a provider network 100. A provider network 100 (or, "cloud" provider network or just "cloud") provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service 112 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 107 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

Thus, a cloud provider network typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network 107 (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

Thus, the transactional access manager 102 may provide a storage API (e.g., via application programming interface(s) 114) in a data lake management service 104 that provides ACID transactions for data lakes on a storage service 112. Users may thus use the data lake management service 104 to organize data (e.g., stored in objects 140, possibly provided by an object storage service 112 of the provider network 100) into tables made up of rows that can include structured or semi-structured data. The transactional access manager 102 may thus, via transactional support, allow multiple users to concurrently and reliably insert, delete, and modify rows across these tables. This makes it easy, for example, to keep data lakes (stored in a storage service 112) continuously up-to-date while simultaneously allowing for the running of analytics queries and/or use of machine learning (ML) that return consistent and real-time results. Users and third parties may thus, in some embodiments, build analytics applications (e.g., application 108B which could be implemented using a hardware virtualization service, or application 108A implemented outside the provider network 100 and executed by one or more computing devices 106, such as in a user's own data center or another public cloud) that directly read from and write to their data lakes through the transactional access manager 102 application programming interface(s) 114 (e.g., public APIs). Also, users can query their data lakes through existing analytics and/or ML services 110 that integrate with the transactional access manager 102, including a cloud data warehouse service, a cloud-based "BigData" cluster-based execution service, a serverless interactive query service, a managed (extract, transform, and load) service, a business intelligence service, a fully-managed ML model creation and/or use service, etc.

In some embodiments, users can enable ACID transactions by creating new governed tables or by converting existing tables in the data catalog of the data lake management service 104 using the transactional access manager 102. The transactional access manager 102 manages the metadata and structure of governed tables and may store their data in files in the customers' own storage locations (e.g., customer-controlled folders or "buckets" within a storage service 112). These governed tables may support files in one or more of a variety of formats, such as formats like CSV, TSV, JSON, Apache ORC, ION, Apache Parquet, etc. Users can also import data from popular open-source transaction-table formats like Delta Lake and Apache Hudi. In some embodiments, this import can be performed very quickly because the transactional access manager 102 leaves the data in place (e.g., in the storage service 112) and only ingests the metadata. Similarly, in some embodiments, users can easily export governed tables to open-source transaction-table formats so they are not locked in and can move their data as they please. Moreover, in some embodiments the transactional access manager 102 tracks changes to governed tables, indexes their history, and minimizes duplication of data. As a result, accessing a historical snapshot of the data lake is fast and cost-efficient, a capability referred to as time travel.

In some embodiments, the transactional access manager 102 supports general ACID transactions that span the data and metadata of multiple tables. Each transaction executes atomically. That is, all of the operations in the transaction finish successfully or none of their effects are reflected in the data. Transactions can include both reads and writes and be issued from different clients concurrently. The transactional access manager 102 isolates the effects of concurrent transactions. When successfully committed, the effects of transactions are also durable.

In some embodiments, data lake administrators may create tables and define security policies using the data lake management service 104. When reading data using integrated analytics services via the API(s) 114, the transactional access manager 102 enforces these security policies. Moreover, in some embodiments the transactional access manager 102 provides "update" APIs that work with governed tables, making it possible to create new governed tables or modify an existing data lake management service table to be governed. With a governed table, users can not only query its data, but also perform transactional updates down to individual rows. The transactional access manager 102 in some embodiments also provides a manifest-based API for batch inserts, and users can optionally import the metadata of an existing table in Apache Hudi or Delta Lake and continue to query the same data without copying the data.

Thus, the functionality of the transactional access manager 102 can be accessed by users via one or more API type calls (e.g., via API(s) 114). The transactional access manager 102 may provide two kinds of update APIs for governed tables. First, manifest-based APIs allow users to add or remove data objects 140 (e.g., files stored in a storage service 112) from a table's manifest. Second, row-level APIs allow users to insert, delete, or update individual rows, e.g., as identified by primary key.

The transactional access manager 102 manifest-based APIs may allow users to add or remove data objects 140 from a governed table. These APIs are metadata operations. Users write objects 140 to the storage service 112 (e.g., via APIs or other interfaces supported by the storage service 112) and then call the transactional access manager 102 to add the objects to the table's manifest and make them visible. This can be particularly useful for append-only workloads that add large amounts of data to existing tables. The manifest is updated atomically, ensuring that users see a consistent view of the table, even when multiple objects are added or removed. Additionally, these APIs can be used along with the transactions to make changes that span multiple tables and modify both the manifests as well as other metadata stored in the data catalog. Common analytics engines may automatically use these manifest APIs when appending data to an existing governed table or deleting complete objects, such as the contents of an entire partition.

The row-level APIs provided by the transactional access manager 102 may be used to insert, delete, and update individual rows in governed tables. Row-level updates work well when users need to modify a small number of rows in many data objects 140, as they don't require actually rewriting the objects. Users may specify the primary key of the row and the corresponding change—whether to insert, delete, or update the row. Internally, the transactional access manager 102 tracks which object 140 contains each row and may create a delta file for each object that contains the updates that need to be applied when the data is read. Users can also specify that an update should be forced. Forced updates are reflected immediately in the underlying storage (e.g., storage service 112) and can be used when deleting data to comply with "right to be forgotten" regulations such as General Data Protection Regulation (GDPR). In some embodiments, applications or services may convert traditional queries (e.g., SQL update statements) to use these APIs.

In some embodiments, every transaction that commits data to a governed table is assigned a unique identifier (or "transaction identifier" or "transaction ID"). Users can provide this transaction identifier when querying data to view a consistent snapshot as of the time of that transaction, or they can provide a timestamp to view a consistent snapshot as of an arbitrarily selected time. This lets users see previous versions of a dataset to rerun queries, investigate errors, etc. As the transactional access manager 102 can support general transactions, these queries can span multiple tables. Users can also configure the length of history that is maintained by the transactional access manager 102, and in addition to performing regular deletions, data (e.g., rows) in some embodiments can also be "force deleted" (e.g., via a special flag, argument, or even a special API call) and thus removed from all time-travel queries, e.g., to allow for the right to be forgotten.

As shown in FIG. 1, in some embodiments the transactional access manager 102 includes the following components that are involved in transaction processing. The transactional access manager 102 may include a fleet of servers 116A-116N (e.g., containers, virtual machines, etc.) that execute code to process the calls made via the API(s) 114 including transaction operations. Each server 116A-116N may include a catalog manager 120, a version manager 122 (itself including or using a tree manager 124), a log manager 126, and a lock manager 128. The catalog manager 120 may be software that manages persistent metadata about each table such as its schema and data objects within a (separate) catalog data structure (e.g., catalog table 130). The version manager 122 may be software that maintains a time-ordered list of the committed versions of each table within a (separate) version data structure (e.g., version table 132). The tree manager 124 may be software that stores nodes of a tree (e.g., a b-tree or similar) that collectively map partition keys to the data objects (e.g., in terms of references to these storage objects, such as storage location identifiers like a folder/bucket name, URL or URI, etc.) belonging to each version of each table, within a (separate) tree data structure (e.g., stored in a b-tree table 134). The log manager 126 may be software that records a write-ahead log of all operations within a transaction within a (separate) log data structure (e.g., log table 136). The lock manager 128 may be software that controls the exclusive write locks on objects and tables that are being created or updated or deleted within a transaction using a (separate) lock data structure (e.g., lock table 138). As described herein, these example data structures (here, tables) may be used, and may include relational database tables, NoSQL tables, key-value store tables or groupings, etc. However, it is to be understood that other types of data structures may be used independent of these tables, or used and stored within these tables—e.g., a linked list or b-tree may be stored using records in tables, as is known to those of skill in the art. As used herein, a b-tree may be used broadly to refer to multiple types of trees, such as m-ary trees like B trees, B+ trees, B-star-trees, and the like.

As these data stores (tables 130, 132, 134, 136, and 138) are in some cases stored separately from the servers 116A-116N that utilize them, the fleet may access and/or update this data in a potentially parallel, concurrent manner using the techniques and protocols described herein to ensure the needed ACID properties.

In addition to the fleet of servers, in some embodiments the transactional access manager 102 includes a recovery manager 118 (e.g., software executed by a server computing device, within a virtual machine, within a container, or the like). The recovery manager 118 can act separate from the fleet of servers 116A-116N to detect and complete transactions that are stalled, e.g., by aborting them or pushing them forward to completion.

As depicted in this figure, the fleet of servers 116A-116N call on the various managers that coordinate their actions by reading and writing transaction-specific data that is stored in the illustrated tables, which could be provided by a separate database service of the provider network.

In some embodiments, this fleet of servers 116A-116N is fronted by a (non-illustrated) load balancer. In these embodiments, any of the fleet of servers 116A-116N can receive any requested operation for any transaction. Thus, a call to begin a transaction may be performed by a first server, a call to add an object for the transaction may be performed by a second server, and a call to commit the transaction may be processed by a third server.

Notably, in some embodiments the servers do not require clock synchronization (as is commonly used for transactional support) and implementations need not make assumptions about clock synchronization. Accordingly, embodiments tolerate unsynchronized server clocks, intrinsic communication delays, etc., and still ensure the consistency and proper ordering of transactions.

As indicated herein, the data lake management service 104 may store user data in tables that are registered in a data catalog and whose data objects are stored in another location (e.g., a storage service) as, for example, Parquet or similarly formatted files. The transactional access manager 102 may provide users with the ability to run jobs that perform a sequence of operations that manipulate tables and their data with assurances that those operations are executed atomically and without interference from other concurrent jobs.

As an example, one of the most basic user scenarios in a data lake is ingesting one or more data objects (e.g., into the storage service) and registering them as a table in the data catalog so that the data can be queried by other analytics tools. Suppose that this table is partitioned into two CSV files that are stored as two separate objects in the storage service. A sequence of operations for creating the new table could be as follows, which includes two calls to "put" a data object into a storage service "bucket" and a call to create the table:

Storage.Put(bucket, path1, data1, "csv")
    Storage.Put(bucket, path2, data2, "csv")
    Catalog.CreateTable(catalog, database, name, "csv", bucket, path1, path2)

However, if the client program crashes while performing this sequence of operations, objects could have been written to the storage service that are not registered in the data catalog. These objects are thus "garbage" that need to be discovered and deleted somehow. Or, the client would need to determine where in the sequence the crash occurred and then restart from that place. Both approaches add complexity to the ingestion process.

In contrast, via use of atomic transactions provided by the transactional access manager 102 users can avoid this problem. With support for transactions, the ingestion sequence easily could be rewritten as the following 5-step process:

txid=Govern.BeginTransaction( )
    tableid=Govern.CreateTable(txid, catalog, database, name, "csv")
    Govern.Put(txid, tableid, bucket, path1, data1)
    Govern.Put(txid, tableid, bucket, path2, data2)
    Govern.CommitTransaction(txid)

If a crash occurs while performing this sequence before the transaction commits, then all of the operations are automatically undone by the transactional access manager 102, leaving no partial results. Thus, the ingestion job can simply be restarted from the beginning with a fresh transaction.

As another example, consider the compaction process of combining a set of storage objects into one larger object. Streaming ingestion continually adds new data files to a storage location or set thereof. This results in a potentially large number of small data objects, which leads to poor query performance Hence, many users may periodically perform compaction by reading all of the data objects (from a storage service) that "belong" to a table, merging their contents, and writing a single large data object (back to the storage service) with all of the combined data, and then deleting the many small objects. Without transactions, this requires users to halt their ingestion process—as well as queries—so that these operations do not interfere with the multi-step compaction process. Using the transactional support of the transactional access manager 102, however, the steps of the compaction can be completed atomically and in parallel with ongoing queries, which read from consistent snapshots, and ingestion jobs, which add new data using their own transactions.

Figure 2:
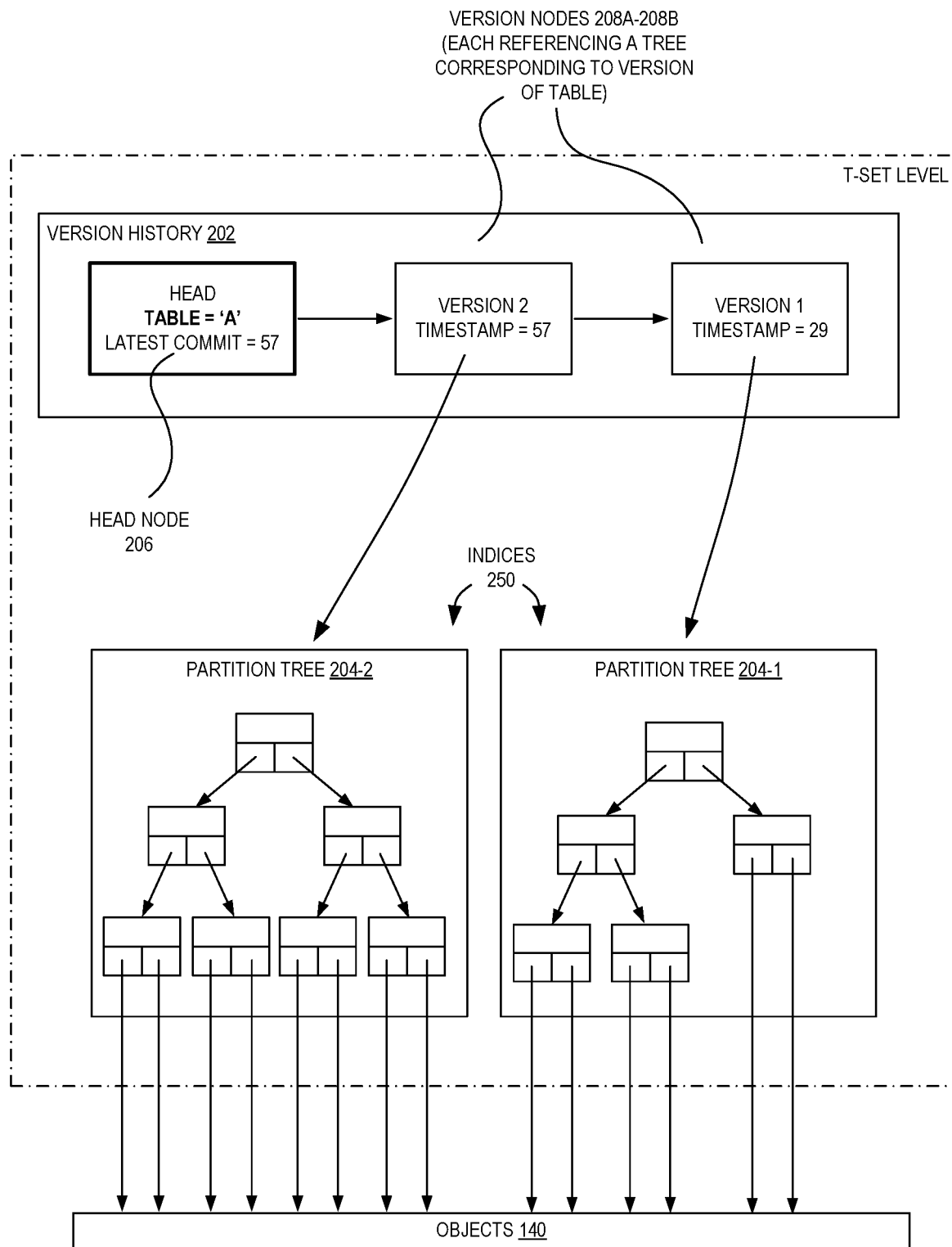
FIG. 2 is a diagram illustrating exemplary data structures utilized by a transactional access manager for enabling transactional data lake access with time travel capability according to some embodiments.

Accordingly, the transactional access manager 102—via use of its interface (e.g., API calls)—provides users with a transaction mechanism that guarantees the ACID properties of atomicity, consistency, isolation, and durability for interacting with an underlying data lake. To this end, FIG. 2 is a diagram illustrating exemplary data structures utilized by the transactional access manager for enabling transactional data lake access with time travel capability according to some embodiments. In FIG. 2, an exemplary version history 202 data structure (e.g., stored in the version table 132 of FIG. 1) and multiple partition tree 204 data structures (e.g., stored in the b-tree table 134 of FIG. 1) are illustrated that may collectively form a "transaction set" (or one level of a transaction set) described later herein.

The version history 202 data structure may be formed as a list (e.g., a linked list) or another similar data structure that can provide an ordering of nodes (or elements). As illustrated, the version history 202 includes a head node 206 and one or more (here, two) version nodes 208A-208B. The head node 206 may include an identifier of an associated entity (here, a table 'A'), one or more timestamps (or time values, date values, sequence numbers, or the like)—here, a "latest commit" time value (of "57") is shown indicating a time of a most-recent commit of a transaction made to the associated table. The head node 206 points to a most recent version node 208A, which itself may include metadata such as a version identifier, timing data of the commit time of the associated transaction (here, a "timestamp" value of "57"), and a non-illustrated reference to a tree data structure representing the state of the table as of that transaction commit. The reference may be an identifier of a data structure such as a row of a database that stores a record corresponding to a root node of the tree, for example, though many other possibilities exist.

Each version node 208 may or may not include a reference to a next, previous version node (here, version node 208B). Generally, if a previous version of the entity (table A) existed before the transaction associated with a node, that node will include a reference (or pointer, or other identifier) of another node corresponding to an immediately preceding transaction that committed—here, version '1' with a timestamp of "29." This version node 208B does not have a reference to a next node (perhaps by storing a null or empty value instead of the reference) and thus this represents the first (oldest) version of the table. However, as each version node includes a reference to a tree, this version node 208B references a tree as well—partition tree 204-1. In some embodiments, this version history 202 set of nodes can be traversed to identify a particular partition tree corresponding to the state of the table as of a particular point in time desired by a client—i.e., to satisfy a time travel. This structure can also be used to keep track of various uncommitted trees (e.g., resulting from operations of a not-yet-committed transaction) to allow for the transaction to "read its own writes" as described in further detail later herein.

In some embodiments, each tree (here, partition trees 204-1 through 204-2) may include one or more levels of nodes, where some levels (e.g., only leaf nodes) or all levels may include references to particular data objects, such as storage location identifiers (e.g., a unique folder or bucket name within a storage system such as an object storage service, a full URL or URI, another type of path, etc.). Thus, the trees 204 may serve as indices 250, each indexing a set of data objects belonging to a particular version of a table, though in other embodiments the trees may index other types of entities or objects. The trees may be arranged and thus traversed in a variety of manners, such as through use of primary keys or partition keys. As one example, a date value may serve as a partition key to allow data associated with a particular date or range of dates to be easily found through simple tree traversal operations. In the end, a set of references (or identifiers) of the data objects involved in a query or similar operation can be identified, and a calling application (or other module) can use these data object references to obtain the data as needed.

Figure 3:
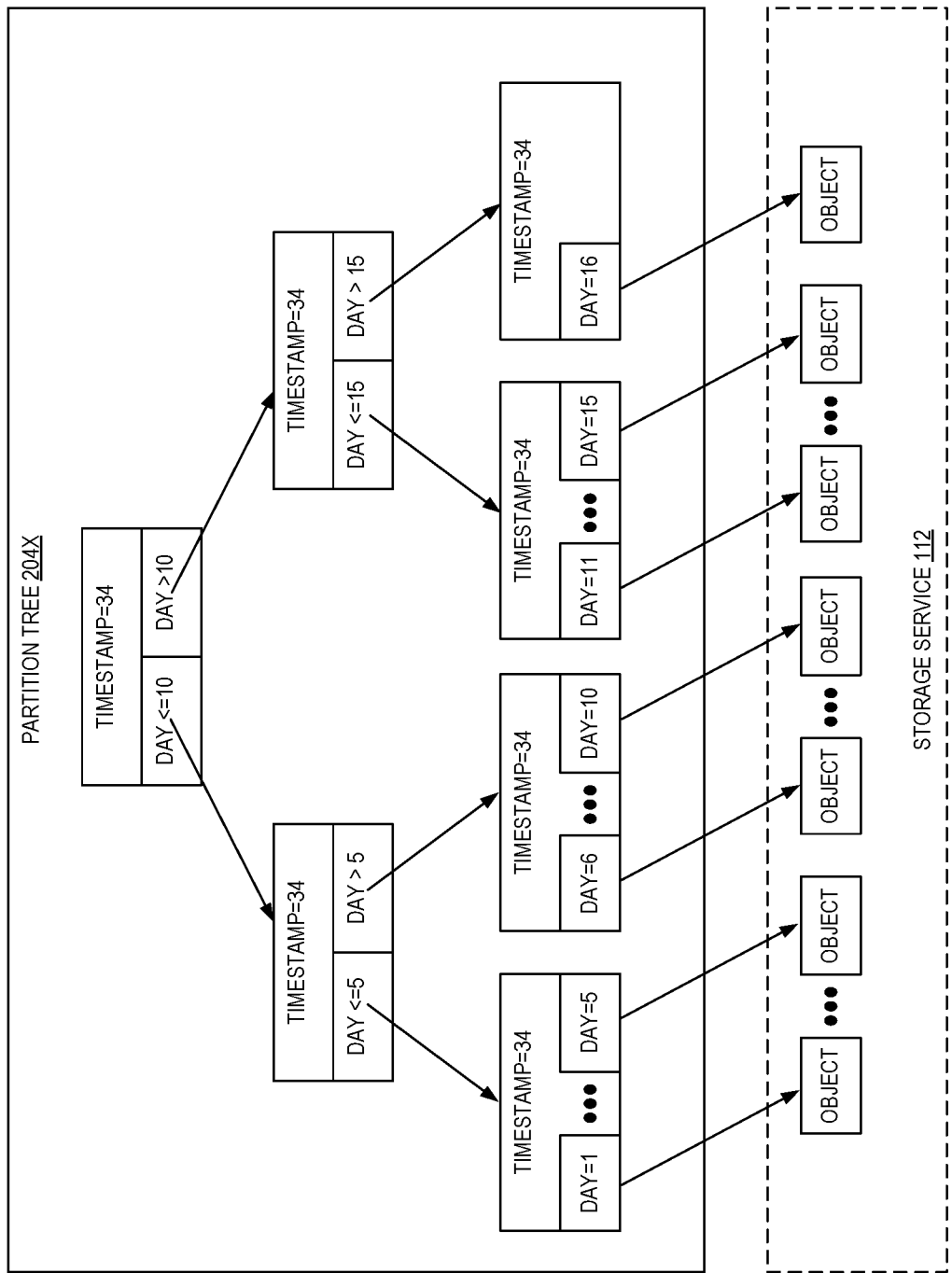
FIG. 3 is a diagram illustrating further detail of an exemplary partition tree data structure utilized by a transactional access manager as part of enabling transactional data lake access with time travel capability according to some embodiments.

For further detail, FIG. 3 is a diagram illustrating further detail of an exemplary partition tree data structure utilized by a transactional access manager as part of enabling transactional data lake access with time travel capability according to some embodiments. In this figure, an exemplary partition tree 204X is shown with a variety of nodes associated with a commit timestamp (here, each is timestamp "34") as well as splits on a partition of a day number value. In this manner, the tree may be quickly traversed to find references to data objects for a particular day, set of days, and range of days—all of which are common query needs.

Through use of these (and other) data structures, the transactional access manager 102 can implement a protocol to ensure potentially concurrent transactional access adherent to the core ACID principles and yet also allow for time travel of the underlying data, via its API. For example, FIG. 4 is a diagram illustrating exemplary public API functions 400, 450 provided by an interface of a transactional access manager for enabling transactional data lake support according to some embodiments. These example APIs are to be understood as being exemplary and used in one embodiment, and thus other embodiments expose more functions, fewer functions, similar functions with different numbers and/or types of arguments, etc.

For example, a set of transaction-centric APIs 400 may be provided that include calls to begin a transaction (BeginTransaction), commit a transaction (CommitTransaction), abort a transaction (AbortTransaction), extend a transaction (ExtendTransaction), get the status of a transaction (GetTransaction), get information (metadata and/or status) about one or multiple transactions (GetTransactions), etc.

The BeginTransaction call may indicate a request to start a new transaction and may return a transaction id that users can use to identify a particular transaction. The request may optionally include a ReadOnly parameter indicating that that the transaction should be read only, and thus, writes made using a read-only transaction id may be rejected. Read-only transactions in some embodiments do not need to be committed.

The CommitTransaction call may indicate a request to attempt to commit the specified transaction and may return an "AlreadyAborted" exception if the transaction was previously aborted. This call in some embodiments is idempotent if called multiple times for the same transaction. The request may require a Transaction ID parameter identifying the transaction to commit.

The AbortTransaction call may indicate a request to attempt to abort a specified transaction and may return an "AlreadyCommitted" exception if the transaction was previously committed. The AbortTransaction call may require a Transaction ID parameter identifying the transaction.

The ExtendTransaction call may indicate that the specified transaction is still active and should not be treated as idle and aborted. The call may require a Transaction ID parameter identifying the transaction. Optionally, in some embodiments, the call may accept a time parameter indicating an amount of time that the transaction is to be extended for (or until)—e.g., extend for 1 minute, extend until 12:05: 00, etc.

The GetTransaction call (or "DescribeTransaction") may indicate a request to obtain the status of a single transaction. The call may require a Transaction ID parameter identifying the transaction. The response may include one or more of the transaction ID, a transaction status (e.g., ACTIVE, COMMITTED, ABORTED), a transaction start time, a transaction end time, etc.

A GetTransactions call may indicate a request to obtain metadata about transactions and their status. In some embodiments, to avoid the response from growing indefinitely, only uncommitted transactions and those available for time-travel queries are returned, though in other embodiments data for all transactions may be returned. A GetTransactions call may be used, for example, to identify uncommitted transactions or to get information to aid in debugging queries. The GetTransactions call may accept one or more of an optional "CatalogId" parameter indicating the catalog for which to list transactions (and may default to the account id of the caller); an optional StatusFilter parameter indicating a filter to select the status of transactions to return (e.g., ALL, COMPLETED, COMMITTED, ABORTED, ACTIVE) and may default to ALL; an optional "MaxResults" parameter indicating a maximum desired number of transactions to return in a single call, an optional "NextToken" parameter providing a continuation token (returned by a previous call) for subsequent calls to retrieve transactions. The response may include, in some embodiments, a transaction list (each record including one or more of a transaction ID, a transaction status, a transaction start time, a transaction end time) and optionally a "NextToken" providing a continuation token indicating whether additional data is available. In some embodiments, the transactions that can be returned may be time limited (e.g., only a last thirty days or seven days of transactions are available) and may not include read-only transactions.

In some embodiments a set of object-centric APIs 450 may be provided that include calls to get table objects (GetTableObjects), update table objects (UpdateTableObjects), get table objects that have changed between particular transactions (GetChangedTableObjects), etc.

The GetTableObjects call may indicate a request to return data for a set of data objects that make up a specified table. A transaction id or timestamp can be specified for time-travel queries. The request may include an optional CatalogId specifying the data catalog containing the table (and may defaults to the caller's account), a DatabaseName identifying the database containing the table, a TableName identifying the table for which to retrieve objects, an optional TransactionId indicating the transaction Id at which to read the table contents (if not committed, in some embodiments the read will be treated as part of that transaction and will see its writes; if this transaction has aborted, an error may be returned; if not set, the method may default to the most recent committed transaction); an optional "QueryTime" indicating a time as of when to read the table contents (if not set, the most recent transaction commit time may be used); an optional "PartitionPredicate" providing a predicate to filter the objects returned based on the partition keys defined in the table. (e.g., including use of comparison operators such as =, >, <, >=, <=; logical operators such as AND; data types such as integer, long, date(yyyy-MM-dd), timestamp(yyyy-MM-dd HH:mmssXXX or yyyy-MM-dd HH:mmss"), string, decimal, etc.) Additionally, or alternatively, the request may include an optional "MaxResults" parameter specifying how many values to return in a page, and/or an optional "NextToken" parameter providing a continuation token if this is not the first call to retrieve these objects. The response may include an ObjectList of objects organized by partition keys and/or a NextToken providing a continuation token indicating whether additional data is available (and that can be used in a subsequent request).

The UpdateTableObjects call may indicate a request to update a set of table objects, e.g., by providing one or more objects to add and/or one or more objects to delete. The UpdateTableObjects call may include an optional CatalogId specifying the data catalog containing the table (and may defaults to the caller's account), a DatabaseName identifying the database containing the table, a TableName identifying the table to update, an optional TransactionId indicating the transaction Id at which to write the table contents. The call may also or alternatively include a WriteOperations set (or list) of "AddObject" elements (each identifying a location of the data object to add, a tag of the object, a size of the object in bytes, a list of partition values of the object, etc.) and/or "DeleteObject" elements (each identifying a location of the data object to remove, and/or a list of partition values of the object.

The GetChangedTableObjects call may indicate a request to obtain a set of table objects that were added or removed between two specified transactions. The request may include a StartTransactionId indicating an initial transaction to compare and an optional EndTransactionId indicating a final transaction, which may default to a last transaction ID. The request may also or alternatively include one or more of an optional CatalogId specifying the data catalog containing the table (and may defaults to the caller's account), a DatabaseName identifying the database containing the table, a TableName identifying the table, an optional MaxResults indicating a maximum number of values to return in a page, and/or a NextToken indicating a continuation token as described above. The response to the GetChangedTableObjects call may include an ObjectsAdded list of objects organized by partition value that are present in the specified table as of EndTransactionId but were not present as of StartTransactionId, an ObjectsDeleted list of objects organized by partition value that were present in the specified table as of StartTransactionId but are not present as of EndTransactionId, and/or a NextToken providing a continuation token indicating whether additional data is available.

In some embodiments, other calls may be supported, such as a CreateTable call (to create a new table), an UpdateTable call (to update the metadata for an existing table), a DeleteTable call (to delete a table), an UpdateRecords call (to update set of individual records contained in a table, which may or may not be contained in multiple objects), etc.

For more detail, the transactional access manager 102 API includes operations for beginning, committing, and aborting transactions in addition to operations for reading and writing data that can be performed within the context of a transaction. Ones of the below operations may be exposed to users or used "behind the scenes" to support ones of the methods (e.g., those detailed above) that are able to be used by users.

To begin a transaction, the BeginTransaction( ) call creates and returns a new transaction ID and writes to a head log record (e.g., in the version history data structure). Pseudocode for an exemplary BeginTransaction function is as follows, and note that pseudocode for "helper" functions (such as CreateLogHead( ) and the like) will be provided later herein:

BeginTransaction( )=
1. txid=generate unique transaction ID
2. start_time=current time on local clock
3. CreateLogHead(txid, start_time)
4. return txid The returned transaction ID is then passed to other operations that are part of the transaction.

Within a transaction, many different operations can perform "writes," including those that create tables, add data to an existing table, and delete tables. The steps for performing each of these operations within a transaction are similar. For the sake of example, consider two of these that potentially conflict if performed concurrently: AddObject and DeleteTable (though, in some other embodiments the method in the transactional access manager 102 API for modifying a table's data may be called UpdateTableObjects, which accepts a batch of AddObject and DeleteObject operations.)

The example AddObject operation detailed here adds data to a table where the data is already stored in a data object; the DeleteObject steps are similar.

AddObject(txid, table_name, partition, storage_object)=
1. log_head=read log item with key:<txid, 0>
2. if no such txid then return exception
3. AppendLogRecord(log_head, "add", table_name, partition, storage_object)
4. CheckConflictAndAcquireObjectLock(log_head, table_name, storage_object)
5. if conflict then abort and return exception
6. WriteUncommittedBtree(txid, table_name, partition, storage_object)
7. return success Object-level conflicts are detected at this time, but table-level conflicts are left until commit Note that the log record (in log table 136) is written before any locks are acquired and before any other data is written. This allows those actions to be undone by the recovery manager 118 in the case of a transaction failure.

The operation to delete a table is similar:
DeleteTable(txid, table_name)=
1. log_head=read log item with key:<txid,0>
2. if no such txid then return exception
3. AppendLogRecord(log_head, "drop", table_name)
4. CheckConflictsAndAcquireTableLock(log_head, table_name)
5. If conflict then abort and return exception
6. perform uncommitted deletion of table in catalog
7. return success The main differences among different write operations, aside from the semantics of the actual writes being done, lies in how they detect conflicts and lock objects. The above two operations illustrate the common pattern.

For reading data, on the other hand, queries use the read time associated with a transaction to find the latest version that was committed before this time. Because transactions provide a "read your writes" guarantee, where queries within a transaction are allowed to read data that has been written within that transaction, this latest version could be an uncommitted version that is associated with the given transaction ID.

Query(txid, table_name, sql)=
1. log_head=read log item with key:<txid,0>
2. if no such txid then return exception
3. if log_head.status not "active" then return exception
4. version_head=read version head with key: <table_name,0>
5. version=get record in version_head.uncommitted with txid
6. if uncommitted version not found
   a. version=get first committed version where commit_time<log_head.read_time
7. if version_head.commit_time<log_head.read_time and version_head.latest_read<log_head.read_time then
   a. version_head.latest_read=log_head.read_time
   b. update version_head if unchanged
   c. if condition fails then return to step 4
8. if version.btree is null
   a. wait for b-tree to be constructed by post-commit process
9. perform sql query using version.btree
10. return query results Note that a query may need to do a write to update the latest read time in the table's version history. This ensures that future transactions on this table do not get assigned commit times before this read time, which ensures that reads are repeatable.

Users may also make a CommitTransaction call. This function commits the given transaction by making all side-effects of its associated operations permanent. The function returns an indication of whether the transaction committed successfully, meaning that all operations were performed, or were aborted, meaning that the transaction left no side-effects. If the commit request times out, then the caller cannot assume anything about the outcome of the transaction; it may have committed or may have been aborted or may be left in limbo. The caller should retry the call if it receives a timeout. Committing a transaction requires generating a monotonically increasing commit time and reading all of the records in the transaction log to determine which tables are being updated.

CommitTransaction(txid)=
1. log_head=read log item with key:<txid, 0>
2. if no such txid then return exception
3. if log_head.status not "active" then return exception
4. query all log records for txid
5. for each object being written, check that lock is held
6. commit_time=max(local clock, log_head.start+1)
7. for each table being updated in this transaction:
   a. CheckDataConflictAndAcquireTableLock (log_head, table)
   b. version_head=read version head with key: <table_name, 0>
   c. commit_time=max(commit_time, version_head.latest_commit+1)
   d. commit_time=max(commit_time, version_head.latest_read+1)
8. for each table updated in this transaction:
   a. AddToCommittedVersionHistory(txid, table, commit_time)
9. log_head.status="committed"
10. update log_head if status="active" and not updated since step 4
11. if condition fails then abort and return aborted exception
12. return success
13. for each "create" or "drop" log record:
   a. ReleaseTableLockForTableOp(txid, table, commit_time)
14. for each "add" or "delete" log record:
   a. ReleaseTableLockForDataOp(txid, table, commit_time)
   b. ReleaseDataLockForDataOp(txid, table, object, commit_time)
15. MoveStreeFromUncommittedToCommitted (txid, table, commit_time)
16. if b-tree not reused from uncommitted
   a. start background process to build the version b-tree Note that because table locks are acquired during the process of checking for conflicts between AddObject and DeleteTable operations, the version history is also frozen for each of these tables. Thus, the commit time can be chosen to be monotonically increasing since the latest commit time for each table is known.

Users, in some embodiments, can explicitly abort a transaction, thereby undoing any effects of associated operations that were performed. This call returns an indication of whether the transaction was successfully aborted, which should always succeed unless the transaction had been previously committed. If the abort request times out, the caller should retry the call.

AbortTransaction(txid)=
1. log_head=read log item with key:<txid,0>
2. if no such txid then return exception
3. if log_head.status="aborted" then return success
4. log_head.status="aborted"
5. update log_head if status="active"
6. if condition fails then return exception
7. return success
8. query all log records for txid
9. undo effects of all writes
10. remove uncommitted versions from version history
11. for each "create" or "drop" log record:
   a. ReleaseTableLockForTableOp(txid, table, 0)
12. for each "add" or "delete" log record:
   a. ReleaseTableLockForDataOp(txid, table, 0)
   b. ReleaseDataLockForDataOp(txid, table, object, 0)

As outlined above, a number of "internal" functions and other data structures may be used to support these operations. For example, each transaction may conceptually have its own transaction log, which may be stored (e.g., in a database table) as a linked list of timestamped log records. The special log head stores information about the transaction such as its status.

CreateLogHead(txid, start_time)=
1. head.key=<txid,0>
2. head.start=start_time
3. head.read=start_time
4. head.next=null
5. head.status="active"
6. put head as log item if txid does not already exist
7. if condition fails then return exception Appending a new record to the transaction log may involve several steps, some of which may need to be retried if there are concurrent attempts to add records to the same log.

AppendLogRecord(log_head, action, table, partition, object)=
1. if log_head.status not "active" then return exception
2. prev_timestamp=log_head.next
3. new_timestamp=max(current time on local clock, prev_timestamp+1)
4. log_record.key=<log_head.txid,new_timestamp>
5. log_record.next=prev_timestamp
6. log_record.action=action
7. log_record.tname=table
8. log_record.pkey=partition
9. log_record.data=object>
10. put log_record as log item if key does not already exist
11. if condition fails, then return to step 3
12. log_head.next=new_timestamp
13. update log_head in log if next=prev_timestamp and status="active"
14. if condition fails:
   a. delete log_record from log
   b. reread log_head from log
   c. return to step 1

Each log record within a transaction, in some embodiments, has a unique timestamp because the timestamp is part of its key. Updating the log head to link in the newly added record ensures that no new log records can be added after the transaction is no longer active.

The lock table 138, which is used for detecting conflicting writes, holds two types of locks in some embodiments: one at the table level and one at the data object level. The following method may be called when an AddObject operation is requested to detect a conflict with other AddObject operations for the same data object.

CheckConflictAndAcquireObjectLock(log_head, table, object)=
1. entry=GetLockTableEntry (table/object)
2. if entry.txid !=0 and entry.txid !=log_head.txid then abort
3. if entry.data_commit>tx.start then abort
4. update entry.txid=log_head.txid if entry unchanged
5. if update condition failed then abort The first check reports a conflict if the object is already locked by another transaction. The second check reports a conflict if the object was added by another transaction that has already committed.

The following is called for each logged AddObject operation when committing a transaction to detect conflicting operations at the table level and lock the table so that the commit process can proceed.

CheckDataConflictAndAcquireTableLock(log_head, table)=
1. entry=GetLockTableEntry (table)
2. if entry.txid !=0 and entry.txid !=log_head.txid then abort
3. if entry.table_commit>tx.start then abort
4. update entry.txid=log_head.txid if entry unchanged
5. if update condition failed then abort The following is called when a DeleteTable (or other table modifying operation) is requested to ensure that there are no conflicting operations at the table or data object level, and to acquire a table-level lock.

CheckConflictsAndAcquireTableLock(log_head, table)=
1. entry=GetLockTableEntry (table)
2. if entry.txid !=0 and entry.txid !=log_head.txid then abort
3. if entry.table_commit>tx.start then abort
4. if entry.data_commit>tx.start then abort
5. update entry.txid=txid if entry unchanged
6. if update condition failed then abort The process of releasing a lock must also update the commit time that is associated with the lock, unless the transaction aborted.

ReleaseDataLockForDataOp(txid, table, object, commit_time)=
1. entry=GetLockTableEntry (table/object)
2. if entry.txid !=txid then return exception
3. entry.txid=0
4. if commit_time>0 then entry.data_commit=commit_time
5. update entry if entry.txid=txid There are two variations of releasing table-level locks depending on whether the table was exclusively locked by a table operation or shared locked by an operation that added data to the table.

ReleaseTableLockForDataOp(txid, table, commit_time)=
1. entry=GetLockTableEntry (table)
2. if entry.txid !=txid then return exception
3. entry.txid=0
4. if commit_time>0 then entry.data_commit=commit_time
5. update entry if entry.txid=txid ReleaseTableLockForTableOp(txid, table, commit_time)=
1. entry=GetLockTableEntry (table)
2. if entry.txid !=txid then return exception
3. entry.txid=0
4. if commit_time>0 then entry.table_commit=commit_time
5. update entry if entry.txid=txid The data objects for a table may be indexed in a b-tree by their partition keys, forming what is termed "partition trees."

WriteUncommittedBtree(txid, table_name, partition, storage_object)=
1. version_head=read version head with key: <table_name,0>
2. uncommitted.version=look up txid in version_head.uncommited
3. if not present:
   a. AddToUncommittedVersionHistory (txid, table_name, version_head)
4. add partition and storage_object to uncommitted_version.btree When the transaction commits, the uncommitted b-tree can often be converted into the latest committed version by simply updating metadata, pointers, and the like. However, in some scenarios (detailed herein), a new b-tree may be generated again at commit time, such as when certain other transactions commit occur during the transaction.

When a transaction is committing, each updated table's version history is extended with the chosen commit time.

AddToCommittedVersionHistory(txid, table_name, commit_time)=
1. version_head=read version head with key: <table_name,0>
2. new_version.key=<table_name, commit_time>
3. new_version commit_time=commit_time
4. new_version.txid=txid
5. new_version.btree=null 6. new_version.next=version_head.next
7. put new_version
8. prev_latest=version_head.latest
9. version_head.latest=new_version
10. version_head.latest_commit=commit_time
11. update version_head if version_head.latest=prev_latest
12. if condition fails then abort and return conflict exception While a transaction is active, an uncommitted partition tree is recorded in the version history and used for queries within the transaction.

AddToUncommittedVersionHistory(txid, table_name, version_head)=
1. uncommitted_version.key=<table_name, txid>
2. uncommitted_version.txid=txid
3. uncommitted_version.next=version_head. uncommitted.next
4. uncommitted_version.btree=null
5. uncommitted_version.base_commit=version_head. lastest_commit
6. put uncommitted_version
7. version_head.uncommitted=add uncommitted_version to list
8. update version_head if it has not changed At commit time, the uncommitted partition tree can become the commit partition tree if the b-tree from which it was cloned is still the latest version.

MoveStreeFromUncommittedToCommitted(txid, table_name, commit_time)=
1. version_head=read version head with key: <table_name,0>
2. uncommitted_version=lookup version with txid in version_head.uncommitted
3. if uncommitted version.base_commit=version head.latest.next.commit_time
   a. new_version.btree=uncommitted_version.btree
4. remove uncommitted_version from version_head.uncommitted As presented above, this transaction mechanism for the data lake supports the ACID properties: Atomicity, Consistency, Isolation, and Durability. Of these four properties, the most challenging are atomicity and isolation.

Atomicity ensures that a set of operations on the data lake are either completely performed or none of them all. For example, when ingesting a collection of data objects, it is not acceptable to ingest some of the objects but fail without ingesting the others. That would leave a partial data set in the data lake, which could be confusing to users who are reading the data. Moreover, it puts the burden on the ingestion process to figure out what data got successfully written and what did not so that it can correctly resume ingestion.

Abstractly, an isolation scheme ensures that concurrent transactions do not interfere with each other. There are varying degrees of isolation that have been defined in the database community. The two strongest isolation guarantees in common use are serializability and snapshot isolation. Serializability ensures that the outcome of executing two concurrent transactions is the same as if those transactions were run one-at-a-time. Providing strict serializability has performance consequences that are unacceptable to many applications. Thus, a more relaxed isolation level called snapshot isolation has become widely adopted, and it is well-suited for use in the data lake.

Snapshot isolation has two desirable properties. First, all queries within a transaction read the data that existed at the time that the transaction started (or at some defined time in the past for time-travel transactions). The data that exists at some point in time is called a snapshot. Importantly, one transaction can be reading from a snapshot while another transaction is writing new data to produce a later snapshot, and these two transactions can run in parallel without interference. Second, two overlapping transactions that attempt to write the same data objects are detecting as conflicting, and one of the transactions is aborted. Thus, snapshot isolation can support the read-modify-write cycles that occur in data lake applications, without resulting in lost updates when concurrent transactions write to the same object.

Versioning and Time-Travel Queries

Figure 5:
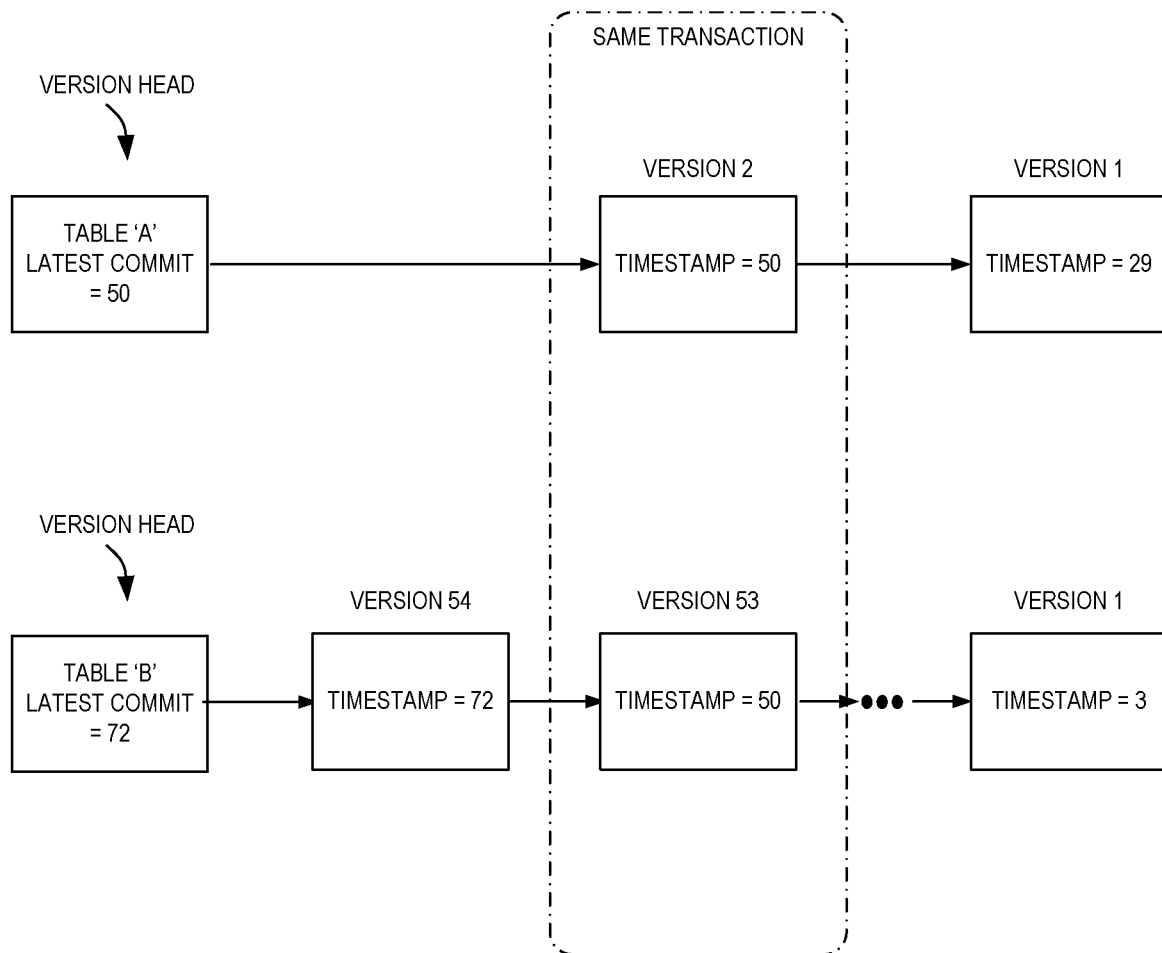
FIG. 5 is a diagram illustrating version history structures of two tables with different version histories but whose second versions resulted from the same transaction according to some embodiments.

In some embodiments, the transactional access manager 102 also provides for efficient versioning and time-travel queries. Each committed write-only or read-write transaction atomically transforms a set of tables from one version (or "snapshot") to the next. Each transaction is assigned a time when the transaction commits, and that commit_time is recorded along with the new version that is produced by that transaction. For each table, the versions are linked together into a version history in which the commit timestamps are monotonically increasing. For example, as seen in FIG. 5, the version history structures of two tables with different version histories but having versions (two and fifty-three) resulting from the same transaction are depicted. By default, in some embodiments the transactional access manager 102 persistently stores each version of a table. However, users may explicitly delete specific versions or define a policy that defines which versions are kept, such as retaining one version per day.

When a transaction begins, it is assigned a read time that defines the committed snapshot that is read by the transaction. Specifically, a read-only transaction queries the version of a table whose commit timestamp is immediately before the transaction's read time in the table's version history. So, for example, if a table, as shown in FIG. 5, has version 1 at timestamp 29 and version 2 at timestamp 50, then a transaction with a read time of 42 will execute queries against version 1 while a transaction with a read time of 100 will read from version 2.

Generally, all queries within a same transaction use the same read time. This ensures that different queries, repeated queries, and queries involving multiple tables read from a consistent snapshot, that is, a snapshot of the database that existed when the transaction began. Importantly, because of multi-versioning, transactions that write data do not affect the queries of ongoing read-only transactions and vice versa.

Queries within a read-write transaction may behave differently. Specifically, such queries will see any writes that were previously performed within the same transaction. A query on a table that has not been written by this transaction, will access the committed version of the table that is defined by the transaction's read time (as described above). However, a query that accesses a table that has been previously written will access a private version containing the transaction's uncommitted data. Thus, if a transaction queries a table, then writes to that table, then queries the table again, the two queries may return different results. This "read your writes" property is a common aspect of snapshot isolation implementations.

In some embodiments, the server 116 that receives a request to begin a new transaction chooses the current time from its local clock as the read time for this transaction. The chosen read time is recorded in the transaction state that is stored in the head node of the transaction log.

A transaction's commit time is assigned when the application explicitly requests that the transaction be committed. If server clocks were synchronized, the commit time could simply be taken as the current clock value of the server that received the commit request. However, in embodiments not assuming clock synchronization exists, additional mechanisms are used to ensure that the commit times and read times for a given table are monotonically increasing.

For each table that is updated by a transaction, the commit process consults the version history to find the commit time of the table's most recent version. The commit time for the transaction is chosen to be later than any of the previous commit times. This ensures monotonically increasing commit times in every table's version history.

However, this is not sufficient to provide snapshot isolation for transactions that include queries. As one example, consider a read-only transaction Tx1 that issues the same query twice with the same read time. The two queries should return the same data according to snapshot isolation. In other words, reads should be repeatable. But this would not happen if another transaction Tx2 that is writing the data being queried is allowed to commit between the two queries and Tx2 is assigned a commit time that is before the start time of Tx1 due to unsynchronized clocks. The second query would see Tx2's newly committed data while the first query did not.

As another example, consider the example where transaction Tx1 reads objects A and B, while transaction Tx2 is concurrently updating A and B. Suppose that both transactions start when A=1 and B=1 with a latest version timestamp of 1, and the start time of transaction Tx1 is 3. Transaction Tx1 reads object A and gets A=1 since that is the latest version before timestamp 3. Now transaction Tx2 writes A=2 and B=2, commits, and is assigned a commit time of 2, which is earlier than the start time of Tx1. When Tx1 reads object B, it will then get B=2 since that is the latest version before its start time. This violates snapshot isolation since Tx1 read A=1 and B=2 which are from different snapshots.

To prevent these problems, a transaction does not get assigned a commit time that is earlier than the start time of another transaction that already read data being written by the committing transaction. To this end, the start time of the latest transaction that read any data from a table is recorded in the head node of that table's version history. A newly assigned commit time for a transaction that updates a table must be later than both the commit time of the latest transaction in that table's version history and the start time of the latest transaction that read data from the table. The downside is that some queries perform writes to the version history; however, this is a relatively small issue that provides substantial benefit.

Figure 6:
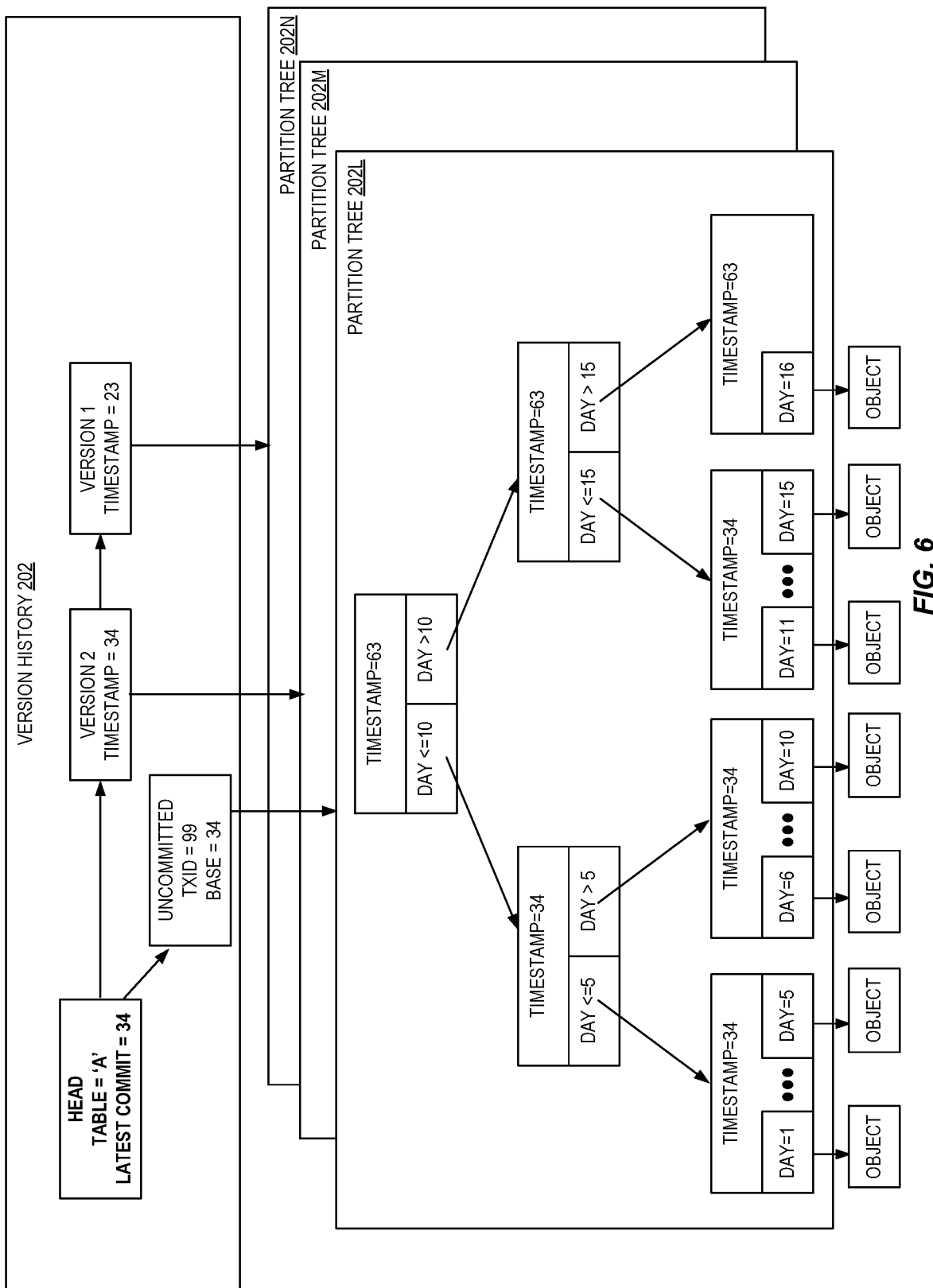
FIG. 6 is a diagram illustrating a version history data structure with two committed versions and one uncommitted version, along with multiple referenced partition trees according to some embodiments.

FIG. 6 is a diagram illustrating a version history data structure with two committed versions and one uncommitted version, along with multiple referenced partition trees according to some embodiments. Queries within one transaction never see the effects of write operations from other transactions that have not yet committed. Queries do, however, see their own uncommitted writes within the same transaction. This is achieved by storing a list of uncommitted versions in each table's version history, where each uncommitted version is associated with a transaction ID. FIG. 6 shows such a version history with two committed versions and one uncommitted version, where the uncommitted node is associated with a transaction ID of "99" and is based upon a "base" version of timestamp "34."

The partition tree for an uncommitted version may be built exactly in the same way as for a committed version. When a server receives a query within a transaction, it first checks to determine whether there is an uncommitted version that is associated with the transaction. If so, that uncommitted partition tree is used for executing the query; otherwise, the query uses a committed partition tree based on the transaction's read time.

Although an application will typically run queries using the transaction's start time as the read time, it optionally may query a version that existed as of some point in time in the past, which is known as a time-travel query. Common uses of time-travel queries include comparing business results from last month against this month's numbers or rerunning a query on a specific snapshot to reproduce a bug. The transactional access manager 102 API permits query calls to include an "as of" time.

In some embodiments, users can selectively delete versions of a table. For example, if a table is transactionally updated every few minutes, the user may not wish to retain hundreds of versions of the table per day but rather have a policy of retaining one version (or only a few versions) per day. Specific versions of a table can be explicitly deleted or discarded automatically according to a retention policy. While the storage for a deleted version can be reclaimed if not shared by other versions, a record of the version remains in the version history and is simply marked as deleted. A time-travel query that would have accessed the deleted version returns with a failure exception since the data is no longer available.

Table Storage and Organization

As described herein, the data for a table includes a set of rows and is stored as one or more data objects, which may be within one or more storage locations provided by a distributed object storage service. The data may be physically grouped according to a partition key that is the value of one or more columns in a row. For simplicity, assume that each data object contains only rows for a single partition key, though that is not strictly required. For example, a table could be organized as time-series data where each day serves as a distinct partition key. As new data is ingested into the table, it is stored in data objects associated with the current day.

In general, a query scans all of the data objects associated with a table and applies a filter expression to each row in order to generate the query results. The exception is when the query contains a filter predicate on the partition key. For example, a query on a time-series table may select data in the last week and then apply a more specific filter to find the desired rows. To facilitate the execution of such queries, the transactional access manager 102 may maintain a b-tree index on a table's data called a partition tree. The b-tree maps partition keys to data objects. For example, in FIG. 6 a partition tree 202L is shown in which the data is partitioned by day.

A query that contains a predicate on the partition key can use the partition tree to determine the set of data objects that might contain rows matching the query, and only fetch that select set of objects from the storage locations. For example, although a table that contains many years' worth of data may comprise thousands of data objects, a query over the past week's data might only fetch tens of objects.

For each version of a table, in some embodiments a new partition tree is produced after the transaction that updated the table is committed. Each node in the table's version history points to the root of the partition tree for that version. When a transaction commits and a new version is added to the version history, the b-tree for the previous version may be copied to the new version and then any updates within the transaction are applied to the new b-tree.

When processing a query, the transactional access manager 102 first finds the version that immediately precedes the transaction's read time, and then uses the partition tree associated with that version to filter the set of data objects that must be scanned.

Figure 7:
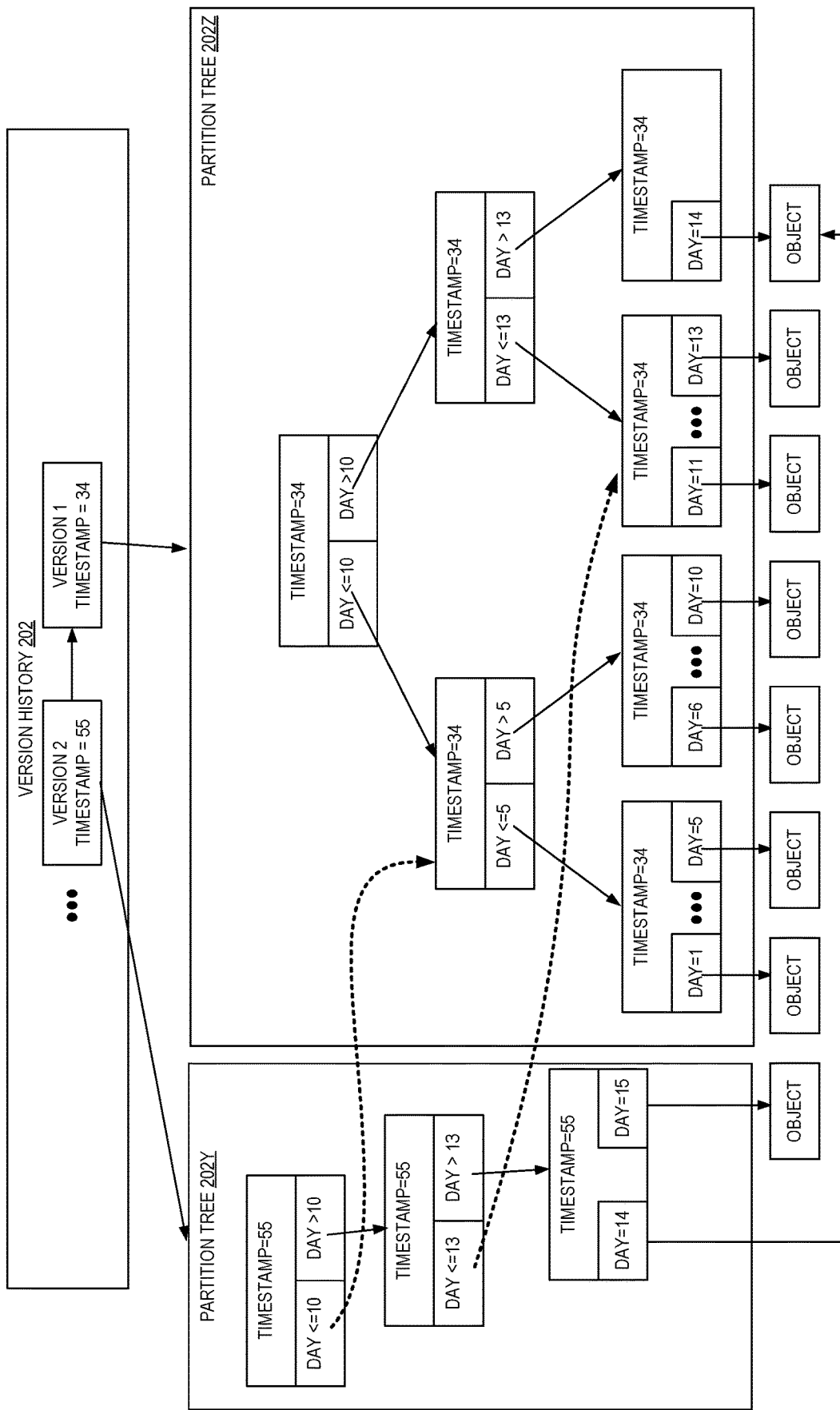
FIG. 7 is a diagram illustrating partition trees with shared nodes according to some embodiments.

Although each table version has a unique partition tree, the b-trees for different versions of the same table may share nodes. FIG. 7 is a diagram illustrating partition trees 202Y-202Z with shared nodes according to some embodiments.

As a table may have thousands or millions of data objects, each version's partition tree could contain a large number of b-tree nodes. Often, only a small subset of these nodes are updated by a transaction. Making a full copy of the b-tree for every version would waste storage and input/output resources and time. Thus, a next version of a table's partition tree may be cloned from the previous version using a copy-on-write technique. The two versions "share" some nodes that are unchanged between the versions, which could be most of the nodes in typical cases. If one leaf node is updated by a transaction, a copy of that node is made before performing the update and all nodes on the path from that leaf to the root of the b-tree are also copied (and updated).

For example, when ingesting new data into a time-series table, only the last nodes of the b-tree are updated while all of the others remain untouched. In FIG. 7, the partition tree on the left for the version with timestamp "55" has added an object to the lower right leaf node, and this new tree shares four of the its seven b-tree nodes with the tree on the right for the previous version of this table, and has three of its own unique nodes.

While a transaction is active, any operations that add data objects to a table or remove data objects operate on an uncommitted partition tree for the table. Upon the first data update, the uncommitted partition tree is cloned from the most recent committed version using copy-on-write. Updates are then applied to the uncommitted partition tree, and this tree is used for "read your writes" queries.

Note that it is possible to lazily construct uncommitted partition trees. In particular, for write-only transactions, it can be more efficient to wait until a transaction commits before building the partition tree. Waiting is especially effective if the transaction ends up aborting. The same applies to transactions that perform queries first and then write data, which is a common pattern. However, whether a transaction will query its own data is unknown in advance. The drawback of waiting to construct an uncommitted partition tree until it is needed by a query is that the query would block while waiting for the construction to complete.

A good compromise is to log operations that update a table before responding to the caller, but then update the partition tree asynchronously. If the caller immediately issues a query after updating a table, then the query may need to wait for the uncommitted partition tree to be constructed. But at least the construction would have been already started and may be near completion.

When a transaction commits, a committed version is added to the version history of each updated table, and this entry includes a pointer to the version's partition tree containing the newly committed data. Often, the uncommitted partition tree can be reused directly by the committed version. When an uncommitted partition tree is first cloned, the commit time of the cloned version is recorded. At commit time, if the cloned version is still the most recent committed version, then the uncommitted partition tree is valid for the next committed version. As long as the transactions that update a table are performed sequentially, then each version's partition tree is built once and is readily converted from uncommitted to committed.

However, some jobs use parallel transactions to ingest data into the same table. In this case, each of the parallel transactions construct their own uncommitted partition trees that are cloned from the same committed version. The first transaction to commit will retain its uncommitted partition tree. But other transactions as they commit will need to rebuild their partition trees since each version's tree must be cloned from the previous version in a linear history. For example, suppose that transaction Tx1 updates a table and commits. Then, transactions Tx2 and Tx3 start and both update the same table while executing concurrently. Both of these transactions will clone the partition tree that was produced by Tx1. If Tx3 commits after Tx2, then it cannot simply install its uncommitted partition tree as the latest version since this tree does not contain Tx2's updates. The commit process for Tx3 will thus clone Tx2's partition tree and then reinstall its own updates.

If a table's partition tree needs to be reconstructed during commit (because the uncommitted partition tree was not based on the latest committed version), this work may be done asynchronously. Specifically, an indication that the transaction successfully committed is returned to the client immediately after changing the status to "committed" in the transaction log. Then, a post-commit background process is started to complete the transaction, including building the partition tree for the newly committed version.

When a committed version is added to a table's version history, the pointer to its partition tree is set to null (except in cases where the uncommitted partition tree was reused). This pointer will eventually be updated by the post-commit background process when the partition tree has been constructed. If a query needs access to this version, it will encounter the null pointer which is an indication that the partition tree is under construction. In this case, the query should block waiting for the version node to be updated.

One complication is that the version history is extended with a new commit time before the transaction actually commits In unlikely failure cases, the commit process may fail to commit the transaction. Thus, the server that is processing a query, when finding a null partition tree, should first check that the transaction has been committed before waiting. If it finds that the transaction had actually been aborted, then it should remove the uncommitted version from the version history and use the previously committed version.

After a transaction commits, its partition tree is constructed by cloning that of the previous version in the version history and then applying the transaction's updates. This means that a version's partition tree cannot be built until the previous version's partition tree is completed. In practice, a transaction may involve an unlimited number of logged updates, and hence committing a transaction will take less time than constructing its partition tree. So, the sequential process of building partition trees, which runs as a post-commit background process, could fall behind if many transactions commit in rapid succession.

If the post-commit background process finds that it must build the partition trees for several recently committed versions and it is falling behind, one option is to combine these versions into a single partition-tree. The effect is as if multiple transactions committed as a single transaction. This in many cases is acceptable to users since there is little value in maintaining huge numbers of versions whose commit times are close together. For example, for time-travel queries, one version per second should be more than sufficient for most use cases.

While sharing nodes can result in significant storage savings, it makes deleting a version more complicated. When deleting a version, a b-tree node is garbage if it is not used by a previous b-tree, that is, if the node was created specifically for this version, and is not used by the next version's b-tree, that is the node was rewritten by the subsequent version. This can be determined by walking the b-trees for the next earlier and next later b-trees.

This design assumes nothing about the locations in which data objects are stored. The b-tree that maps partition keys to data objects can point to arbitrary objects in a storage service location, or, a leaf node in a partition tree could point to data that is stored in another external storage service or location. It is assumed, though, that the data objects that comprise a table are immutable. If data within an object needs to be updated or new data is to be appended, then a new data object should be written. Otherwise, versions would not be immutable and time-travel queries would break.

Locking and Conflicts

Concurrent transactions may perform conflicting writes, causing one or both of the transactions to abort. Whether the isolation guarantee is serializability or snapshot isolation, the basic definition of a conflict is the same. Two transactions conflict if (1) they overlap in execution and (2) they write the same object. Whether transactions overlap is well-defined. Each transaction starts at a particular time and ends at a particular time. Two transactions overlap if the start time of one transaction is between the start and end times of the other transaction. Determining whether two transactions write the same object is a bit trickier.

Within a data lake, as in a relational database, updating the same row of the same table at the same time is clearly a conflict. But what if one transaction deletes the table while another updates a row? What if two transactions insert different rows into the same table? What if one transaction changes the schema for a table while another inserts a new row into the table? In part, the answers depend on the nature of the updates and the semantics of transactional access manager 102 API calls. For example, if a call is made to add a nullable column to a table's schema, then concurrently inserting a new row could be allowed. But if the schema change is to remove a column, then inserting a row that contains that column should not be allowed.

More generally, a conflict arises when committing a transaction would allow it to violate an integrity constraint on the table or database. Requiring all of the rows of a table to match the schema for the table is one such integrity constraint. As another example, there is a constraint that no two tables can have the same name. So, a transaction that attempts to create a table with a name that is already used by another table should be aborted, even if that transaction does not overlap with any other transactions.

Some conflicts are detected when a write operation is submitted to a transactional access manager 102 server and others are detected when a transaction attempts to commit. When it receives an operation that is part of a transaction, the server (or transaction manager) must decide whether to accept that operation, in which case a new record is added to the transaction log, or reject the operation, in which case the whole transaction is aborted.

Note that is it possible to accept an operation, write it to the transaction log, and then decide at the end of the transaction whether to commit or abort. In some cases, this can produce a better outcome than aggressively aborting transactions. For example, suppose that a write is submitted that updates a given row and it is determined that the row has already been updated by another currently executing transaction. It is possible that the other transaction may eventually be aborted, allowing this transaction to commit.

In this design, the approach is to abort a conflicting transaction as early as possible so as to avoid wasted work. Thus, when receiving an operation, the server decides immediately whether to abort the transaction or allow it to continue. If the transaction successfully gets to its end, and the user requests that it be committed, then the commit process will likely be successful.

There are two reasons why a submitted operation may be rejected and the transaction aborted. First, the operation may violate an integrity constraint. Second, it may conflict with a concurrent operation from another transaction, which can be referred to as a concurrency constraint. Both of these conditions are checked independently.

Integrity constraints are defined as preconditions that must be satisfied in order for an operation to be accepted. Different operations have different preconditions. For example, the CreateTable operation has a precondition that a table with the same name does not already exist. As another example, in some embodiments an InsertRow (or UpdateRow) operation is supported, where the InsertRow operation has a few preconditions, namely that the table exists and that a row with the same primary key does not exist, whereas the UpdateRow operation has a precondition that a row with the given primary key does already exist. When receiving an operation, the server first checks all of the associated preconditions and rejects the operation if all of them are not met.

In many cases, checking preconditions is sufficient to detect conflicting operations. For example, consider two conflicting CreateTable operations. The first transaction that calls CreateTable will create an uncommitted version of the table, and it may or may not commit before a second transaction also calls CreateTable with the same name. The second call to CreateTable determines that the table was already created by the first call, and the second transaction therefore aborts. However, not all conflicts can be detected as precondition violations. For example, consider two concurrent transactions that both call UpdateRow on the same primary key. The precondition for this operation is simply that the row already exists, and assuming that it does, neither call will fail the precondition check. However, the second transaction to call UpdateRow should abort since it violates a concurrency constraint.

There are three main types of conflicting writes that involve concurrency constraints. One, a conflict occurs when two different transactions attempt to add/delete the same data object to/from the same table. One could argue that these transactions should be allowed to both commit since adding the same object is an idempotent operation. However, these are currently declared as a conflict and one of the transactions is aborted. Two, a conflict occurs when one transaction adds/deletes an object to/from a table while another transaction is deleting that table or modifying its schema or performing some other change to the table that might be incompatible with the data being added. Three, a conflict occurs when two transactions are concurrently updating the catalog entry for the same table. For example, one transaction may attempt to delete the table while another is modifying its schema. Note that other types of conflicts arise with other types of API calls used in other embodiments, such as with calls for performing row-level updates.

Concurrent operations that add data to the same table do not necessarily conflict. Commonly, users ingest new data into a table by running multiple ingestion jobs in parallel. Each job may be adding data with different partition keys. In some embodiments, each of these jobs run as independent transactions. To support this usage pattern without incurring excessive transaction aborts, concurrent transactions can write to the same table without conflicting as long as they are adding different data objects.

Locking is the traditional way to prevent concurrent transactions from writing the same objects and potentially clobbering each other's updates. That is, locking is used to enforce concurrency constraints. Before writing an object, a server first acquires an exclusive lock on the object, and it holds that lock until the end of the transaction. A lock manager manages the information about objects that are currently being written or that have been written in the recent past. This information is stored in a lock table.

If a server tries to acquire a lock on an object that is already locked, the lock manager will not grant the lock request. In such a case, the server could wait and retry the lock request in hopes that the current holding transaction commits quickly or the lock manager could maintain a queue of lock requests, but a simpler approach used in some embodiments is to abort a transaction if it needs a write lock that it cannot acquire. The application will receive a failure response for the operation that attempted to update the locked object, and is responsible for re-executing the transaction from the beginning.

In some embodiments, the transactional access manager 102 adheres to the following main principles for managing locks. First, any operation that must acquire a lock does so after writing a record to the transaction log. When trying to commit a transaction, the server cannot assume that any locks have already been successfully acquired. Checking for conflicts must also involve grabbing locks to prevent the checked condition from changing before a transaction is committed. It is okay and often desirable to check for conflicts during a transaction without grabbing locks (such as checking for table-level conflicts) in order to abort a transaction early. Finally, table-level exclusive locks should not be held for any longer than necessary.

The lock manager maintains a mapping of lock names to the IDs of transactions that currently hold locks on those objects. In some embodiments, two types of entities may be locked: tables and data objects.

An AddObject operation obtains a lock on the data object that is being added. Since the transactional access manager 102 does not prevent a same object from being added to different tables, the lock name may be a combination of the table name and data object pathname/storage location. The table name component is to be unique since the lock table is shared by all transactions. Thus, the table name that is used for locking is a fully qualified name of the form "catalog/database/table." The data object name is also to be unique, and may be of the form "bucket/pathname" or a URL.

A DeleteTable operation, as well as other operations that modify a table's metadata, obtains a lock on the table itself. This lock ensures that other concurrent transactions do not modify the same table with conflicting operations.

An AddObject operation does not obtain a lock on the table since that would prevent concurrent transactions from adding objects to the same table. Instead, at commit time, a table-level lock is obtained just before the transaction commits for any tables to which objects are added/deleted, and then such locks are released immediately after the transaction commits. The table lock is obtained in order to ensure that a concurrent transaction is not modifying the catalog entry for the table. For example, without table-level locking, the committing transaction could check that a table exists, but then another concurrent transaction could delete the table while the first transaction is committing its writes.

Concurrent and conflicting operations can be detected in the following manner Each entry in the lock table maps a lock name to the identifier of the transaction that holds the lock. When a lock is released, the transaction ID is set to zero/empty but the lock is not immediately discarded from the lock table. Entries remain in the lock table in order to detect concurrency conflicts. Consider the scenario of two transactions that start at about the same time, where Tx1 adds data to a table while Tx2 attempts to delete the same table. Clearly, these two transactions conflict, and only one should be allowed to commit Suppose that Tx1 finishes its execution before the delete operation for Tx2 is requested. Tx1 grabs a lock on the data object that it is adding, then acquires a lock on the table, then commits, and then releases both of these locks. If Tx1's entries in the lock table were immediately discarded, then Tx2 would subsequently be allowed to acquire the table-level lock and commit its delete operation. This example illustrates that write locks are insufficient to detect concurrent transactions and enforce concurrency constraints.

For object-level locks, the lock manager, in addition to the identifier of the transaction that currently holds the lock for a data object, also stores the commit time of the transaction that last added/removed this object. That is, the lock table stores triples: <lock name, commit time, txid>. When attempting to acquire a lock for an object, two conditions may prevent the lock from being acquired. First, if the object is already locked by an uncommitted transaction, as indicated by a non-null transaction ID in the lock table, then the lock attempt will fail. Second, if the object had been added by another overlapping transaction that has already committed, then the lock attempt will fail even though the object is no longer locked. This overlapping condition is detected when the commit time recorded in the lock table is later than the start time of the transaction that is attempting to acquire the lock. Specifically, a lock cannot be acquired by transaction Tx2 if there is an entry in the lock table showing that either (a) the object is still locked by Tx1, or (b) the commit time for Tx1 was after the start time for transaction Tx2, meaning that Tx1 overlapped its execution with Tx2 and wrote the same object. Or, stated more positively, a lock can be acquired by Tx2 if (a) there is no entry in the lock table for the object being locked or (b) the commit time of the object's entry is before Tx2's start time.

For table-level locks, the situation is slightly more involved. As for object-level conflicts, conflicting table-level operations are detected by grabbing table-level locks, recording commit times, and detecting an overlapping commit But since concurrent transactions are allowed to add different objects to the same table without resulting in a conflict, operations that update a table's data require a different scheme. Conceptually, operations that add distinct data objects to a table want to acquire non-exclusive locks on the table. Such a "shared" lock would allow other data operations while preventing table operations. However, implementing shared locks would add complexity to the lock manager since it needs to record a list of transactions that hold the shared lock and updating this list could become a bottleneck. So, this design takes a simpler approach. At commit time, for each table to which data is being added, the commit process acquires an exclusive lock on the table, then commits, and then immediately releases the lock. Concurrency is restricted since concurrent transactions must acquire the table-level lock sequentially, but the impact is minimal since the lock is held for a short time.

Additionally, the transaction that adds data still needs to detect whether any concurrent transaction that previously committed performed a table-level operation, and a transaction that is updating the table needs to detect whether data was added concurrently by a committed transaction. As mentioned above, commit times are recorded in the lock table for this purpose. For each table-level lock, two commit times are recorded. The data commit time indicates when data was last added to the table and is checked when a table-level operation attempts to commit. The table commit time, however, indicates when a table-level operation, such as DeleteTable, was last committed, and is checked when a transaction containing data operations attempts to commit.

Unlike traditional lock tables where entries can be discarded as soon as the lock for an object is released, a lock table entry for an object, since it records the last commit time for this object, must be retained for as long a concurrent transaction may be running In theory, a long-lived transaction might run indefinitely, requiring lock tables entries to be stored indefinitely. In practice, there are options for discarding old lock table entries.

One option is to read the start times of all currently running transactions from the transaction log. Lock table entries could be discarded whose commit times are earlier than the start time of the longest running current transaction. Additionally, embodiments may need to ensure that new transactions are not assigned start times that are earlier than the commit times of any discarded lock table entries.

A simpler implementation option is to limit the length of time for which a transaction can run. For example, the transactional access manager 102 in some embodiments may abort any transaction that runs for longer that a particular duration, e.g., more than a day. This allows lock table entries to be discarded for objects that were written longer ago than the maximum transaction length.

Obtaining write locks and holding them until the transaction commits is necessary but not sufficient to achieve snapshot isolation. Consider the example of a read-modify-write cycle in which two concurrent transactions, Tx1 and Tx2, both read object A which has a numerical value and then update object A by adding one to its current value. Suppose that both transactions start when object A has a value of 1. Transaction Tx1 reads A. Transaction Tx2 also reads A. Transaction Tx1 then acquires the write lock on A, writes the new value of A=2, commits, and releases the lock. Now, Tx2 acquires the lock on object A, adds one to the value of A that it had previously read, writes A=2, and successfully commits Clearly, the latest value of A should be A=3 since it was incremented by two transactions that both committed. The above sequence of execution is a violation of snapshot isolation.

One solution is to acquire locks on objects that are both read and written. In the above example, transactions Tx1 and Tx2 would both acquire read locks on A, and the lock held by Tx2 would prevent transaction Tx1 from later writing object A. This would provide serializability, a stronger guarantee than snapshot isolation. But it comes at a cost. For one thing, read and write transactions can cause each other to abort. Moreover, even read-only transactions must acquire and release locks on the objects that they read.

Embodiments use an alternative that avoids read locks, namely to detect writes by overlapping transactions. Recording commit times in the lock table permits a transaction to determine whether an item that it is trying to lock had been previously locked by an overlapping transaction. Essentially, there is an implicit assumption that any object being written was read by the transaction at its start time.

The lack of synchronized clocks can lead to a violation of snapshot isolation if transaction Tx1 is assigned a commit time by one server that is before the start time of transaction Tx2 that was assigned by a different server even though Tx1 committed after Tx2 started. The lock table, in this case, would incorrectly show that the transactions Tx1 and Tx2 had been executed sequentially when, in fact, they were executing concurrently. This problem is avoided by recording the latest read time for a table in its version history and ensuring that commit times for transactions that write to this table are later than any previous read times.

Locks on data objects are acquired during a transaction when AddObject operations are received by transactional access manager 102 servers. So, assuming that all goes well, no additional object-level locking is required before the transaction commits. However, it is possible that a server that is processing an AddObject request could crash after writing the transaction log record for this operation but before successfully acquiring the lock. Thus, in effect, any locks that are acquired while a transaction is executing are merely conveniences that allow early detection of conflicts, while ensuring that all of the necessary locks are held at commit time is required for correctness.

If the commit process detects that a necessary lock is not already held, it can try to acquire the lock, though it is possible that some other transaction may have the object already locked. If a lock is not already held and cannot be acquired at commit time, then the transaction aborts.

Operations that add data to a table acquire object-level locks during execution but delay the acquisition of table-level locks until the transaction commits. If a table-level lock is not available when the transaction attempts to commit, rather than immediately aborting the transaction, the commit process can wait for a small amount of time and then try again to acquire the table lock. Chances are that some parallel ingestion job had acquired the table-level lock in order to commit and should release it shortly.

When a commit (or abort) operation is performed, the post-commit (or post-abort) background process releases all of the locks that are held by the committed (or aborted) transaction. Since the locks for an operation are acquired after the operation is logged, the transaction's log contains all of the information that is needed to determine the locks that must be released.

All of the locks that are held by a transaction can be released immediately after the transaction successfully commits, that is, after successfully changing the status to "committed" in the transaction log. Once committed, the locks are no longer needed, and releasing them as quickly as possible allows other transaction to write to the same tables. Note, however, that the commit time in the lock table must be updated at the same time that a lock is released. Releasing an object's lock and updating its commit time can be accomplished with a single request.

For a transaction that is aborted, locks can and should be released immediately after updating the status to "aborted" in the transaction log. The commit times for the entries that were locked are not updated since these objects were not written.

Logging

A key challenge is performing an atomic sequence of operations using other services that may not directly support transactions. However, this can be achieved with the use of logging. All operations within a transaction are written to a transaction log. Conceptually each transaction has its own transaction log, and each record in this log is timestamped with the time at which the associated API call from a client was received by a transactional access manager 102 server.

A call to BeginTransaction assigns a transaction ID and starts a new log for the transaction. The first item written to the log is the log head and records the time at which the transaction started as well as a pointer to the latest log record. The log head also stores the status of the transaction, which is "active" when the transaction begins.

Each API call may result in one log record (or possibly a set of log records) whose type depends on the method being called. For example, a CreateTable call produces a log record of type "create" (with a timestamp, table/object identifier, etc.), whereas an AddObject call produces a record of type "add". Log records are immutable and linked together in timestamp order.

In addition to writing a log record, each call has as sematic action whose effects need to be undone if the transaction aborts. The transaction log record must be written durably before the operation is performed in order to ensure correct recovery if the transaction fails or is explicitly aborted.

A call to CommitTransaction changes the transaction's status to "committed" and records the commit time in the log head. The call returns a successful response after this change is durably written. Writing the new transaction status is the commit point for the transaction. Erie then invokes a post-commit background process that reads each log record for the committed transaction and performs whatever actions are needed to complete the transaction, such as building the partition b-trees for the new versions of the updated tables. It also releases any locks that were acquired during the transaction's execution.

A call to AbortTransaction writes an "aborted" status to the transaction log. A post-abort background process reads each log record and undoes the effect of any operations. For example, a table that was tentatively created in the catalog must be removed. The post-abort process also releases any locks that were acquired by the transaction.

A given transaction log must eventually transition to the "committed" or "aborted" status. The transaction cannot be simultaneously committed and aborted, even if different servers are processing CommitTransaction and AbortTransaction calls at the same time. Thus, changing the status to "committed" must be done conditionally on the status being "active", and writing an "aborted" status is also done conditionally. As discussed herein, this is accomplished using condition puts.

As committing and aborting a transaction both involve a background process to complete the transaction, a final "completed" status is written when this background process finishes its work. This informs the recovery manager that this transaction need not be further considered. The log records for a completed transaction can be deleted if so desired, though it is prudent to keep them temporarily so that clients can inquire about the outcome of a transaction given its transaction ID.

One concern is that a client may continue to call API operations using a transaction that has already been committed or aborted. This should be prevented since it can lead to a bad outcome. Consider the following example. Suppose that an application begins a transaction, writes some data to a table, and then commits the transaction; and the commit fully completes by extending the table's version history, releasing locks, producing a new b-tree, and writing a "completed" log record. Now, what happens if the client makes a subsequent call to AddObject with the same transaction ID and then crashes? Unless steps are taken to prevent this, a log record will be added and a lock for the updated object will be acquired in the lock table. The recovery manager will not clean up the failed transaction. It will simply notice that the transaction is marked as completed and take no action, effectively ignoring the new log record. Thus, the system would end up with a data object that is never included in the intended table's b-tree and a lock on this object that is never released.

Thus, a transactional access manager 102 server, before performing an operation, could first check whether the transaction has already committed or aborted. However, this would not completely prevent the problem since a race condition could occur where the transaction is committed between the time when the check is completed and the operation is performed. What is required is a test-and-set operation that checks the transaction status and adds a log record atomically.

The log records within a transaction are arranged in a linked list with newer log records pointing to older log records. Writing a new transaction log record involves adding that record to the front of the list. Each transaction's log head stores the current transaction state (active, committed, aborted, or completed) and points to the latest log record. Adding a log record is a two-step process. One, a new log record is created that points to the currently latest log record. Two, the transaction's head node is updated to point to this new log record, but only if the transaction is still in the "active" state.

Fault-Tolerance

A transaction is a sequence of operations, and failures can occur at any point in this sequence, leaving a transaction partially completed. A recovery process is required to undo the effects of a failed transaction that has not committed, and to push forward the completion of an already committed transaction. Consider failures of the client application that is making transactional calls on the transactional access manager API. This application could start a transaction and perform a number of operations before failing to explicitly commit or abort the transaction. A recovery manager runs as a periodic process to clean up such stalled transactions.

The recovery manager periodically scans the heads of all transaction logs looking for transactions that need to be completed. In particular, it finds transactions in the "active" status whose latest log record was written a while ago, say more than 10 seconds. It also looks for transactions with a status of "committed" or "aborted" but for which no background process is running to complete the transaction. Ideally, the recovery manager will perform a scan frequently enough so that stalled transactions do not remain in limbo for too long, but not so frequently that it incurs substantial costs from repeatedly reading the logs. Observe that a failed transaction may be holding locks on objects that need to be updated by other transactions, and so completing failed transactions in a timely matter could be important.

When the recovery manager finds a stalled transaction, there are three cases to consider.

If the transaction's status is "active," the recovery manger has no choice but to abort the transaction since it cannot deduce whether the client application had performed all of the operations that it intended. The recovery manager changes the status in the transaction's log head to "aborted", and then invokes the usual post-abort background process to clean up the transaction. This process finishes by updating the status to "completed". Note that if the client application were still running but just had not performed any recent transactional operations, it may later attempt to commit the transaction and its request would fail.

If the recovery manager finds an aborted transaction, the recovery manager invokes the post-abort background process. It is possible that this process had already run but failed before writing the "completed" status or that it partially cleaned up the transaction's effect. So, the background process is to gracefully deal with the case that some or all of the necessary undo actions have already been performed. For example, the process may attempt to release a lock and find that the transaction does not hold the lock or it may attempt to delete a data object that had already been deleted, which is fine as the requirement is simply that each undo action is idempotent, meaning that nothing bad happens if it is repeated multiple times. It is even okay for multiple background processes to be running in parallel trying to clean up the same transaction. A similar situation arises when a log record is written for an operation but the transactional access manager 102 server crashes before actually performing the action. The recovery manager may discover that undoing the action is not necessary. Eventually, the post-abort background process will succeed at completing its work and mark the transaction as "completed."

If the recovery manager finds a committed transaction that was not completed, this indicates that the post-commit background process failed before completing its work. In this case, the recovery manager completes the transaction by restarting the post-commit process. It is possible that some or all of the post-commit processing had already been completed, and so any actions taken by this process must be idempotent. For example, if it tries to add a new table to the data catalog but finds that the table already exists, then it should assume that the table had already been added by this transaction. When finished, the post-commit process changes the transaction's status to "completed" in the log head.

In some cases, the recovery manager may incorrectly conclude that an application has failed leaving a stalled transaction that must be aborted. Although aborting an idle transaction for which the application is active has negative consequences, it is generally impossible for the recovery manager to distinguish between a stalled transaction and one that is active but temporarily idle. For example, consider a compaction job that reads a large set of data objects at the start of a transaction, works for a while to produce a combined object, and then writes this object as part of the transaction. While doing the bulk of its work, this compaction job is not performing transaction calls and runs the risk of being aborted, thereby causing its work to be wasted.

To let the recovery manager know that a transaction is still active, the transactional access manager 102 in some embodiments provides an ExtendTransaction API call. Applications with long-running transactions may call this method periodically to prevent the transaction from being spontaneously aborted. This call refreshes a timer that is stored in the transaction's log head.

When a server fails while processing an API call, there are several cases to consider:

If the server crashes after receiving a request but before writing a transaction log record, then it is as though the request were never submitted. The client will receive a timeout or failure response from the call. The application, or its client library, will likely retry the call.

If the server crashes after writing the transaction log record but before acquiring locks or performing the action, then the application will timeout and it will likely retry the call until it succeeds. The transaction log will end up with multiple records for the same operation, but that will not cause an issue for either the post-commit or post-abort processing since its actions are idempotent.

If the server crashes after writing the log record, checking for conflicts, and acquiring locks, but before performing the associated action, then the application will retransmit the request. In addition to producing multiple log records, the retry will attempt to acquire locks that the transaction already holds. Those lock acquisitions will succeed, and the operation will be allowed to continue.

If the server crashes after writing the transaction log record and performing the action but before responding to the caller, then the application will receive a timeout. In this case, the application cannot be certain whether or not the operation was performed. The application will likely retry the call. Repeating the call is okay as long as the associated action is idempotent, such as adding a data object to a table. One interesting case is if the application receives a failure response and does not retransmit the call. Although the caller received a non-successful response, the results of the operation will be persisted if the transaction later commits.

If a server fails while starting a transaction, several things may occur. For BeginTransaction, the cases are straightforward. If the server fails before writing a new log head, then a new transaction has not been started. The caller will receive a failure response and retransmit.

If the server crashes after creating the log head but before returning the new transaction ID to the client, then this transaction is useless since the client does not have a transaction ID that it can use in subsequent calls. The recovery manager will eventually determine this to be a stalled transaction and abort it. When the client retries the BeginTransaction call, a new transaction will be started.

If a server fails while committing a transaction, several things may occur. For CommitTransaction calls, the scenario is more complex as there are several steps taken when committing a transaction and the server could fail anywhere in this process.

If the server crashes early in the commit sequence before acquiring table-level locks, then no harm is done. The client will resubmit the CommitTransaction request, and the commit process resumes from the beginning.

If the server crashes after obtaining some or all of the necessary locks, then it will acquire these locks again when the client retransmits the commit request. That is acceptable as lock operations are idempotent.

If the server crashes while extending the version histories of multiple tables, then some of the tables may have new versions already and some may not. When the commit process resumes, after being resubmitted by the client, a new commit time will be generated, and the previously written latest commit time will be obsolete and overwritten with a new commit time.

If the server crashes before changing the transaction status to "committed", then the transaction is not yet committed even though a commit time may have been written as the latest version for each table. Certainly, the transaction can be committed. But it is also possible that the recovery manager runs at this point, observes this transaction as incomplete, and decides to abort it.

If the server crashes after changing the status to "committed" in the transaction's log head but before responding to the caller, then the transaction has been committed but the client is unaware of this outcome. A retry attempt to commit the transaction will fail when the server observes that the transaction had been previously committed.

If the server crashes while executing the post-commit background process, the process can simply be restarted as all of its actions, such as releasing locks, are idempotent.

If the background process crashes while building a new b-tree, then some of the new b-tree nodes may have been written while some have not. When the post-commit process resumes, it will generate a completely new set of b-tree nodes, leaving the previously written nodes as garbage. This is not a correctness problem but is a garbage collection problem. A background process could scan the database looking for b-tree nodes that are not part of any b-trees that are associated with some version of a table.

If the post-commit background process fails after completing its work but before writing the "completed" status, that is unfortunate since all of the work has been done but the transaction log does not reflect this accomplishment. So, a retry of the CommitTransaction call will redo all of the post-commit processing. There are no correctness concerns, just inefficiencies.

If an Erie server fails while aborting a transaction: for AbortTransaction calls, recovery is simpler than for commits. If the server crashes before the transaction's status is set to "aborted," then the transaction is still active. The caller should retransmit the request to abort the transaction.

If the server crashes while executing the post-abort process, after writing the "aborted" status, then the transaction is definitely aborted. However, the post-abort process to undo the effects of any actions may have only been partially performed. Eventually, the recovery manager will observe that the transaction has not been completed and will restart the post-abort background process. But, more than likely, since the caller did not receive a successful response, the caller will retry the abort request, and this retry will immediately resume the post-abort processing.

If the server crashes after completing the abort process but before responding to the caller, the client will retry the AbortTransaction request. The server will observe that the transaction has been completed and return a successful response to the caller without doing any further work.

Metadata Management

In some embodiments, many of the persistent data structures associated with transactions can be stored in database tables, e.g., provided by database service or hosted separately in a self-managed manner.

The transaction logs for all users in a same cell are stored in one table. Users may be grouped into cells where each cell has a shared transaction table. Each log record for a transaction is a separate database item, as is the log head. Each item's key is a combination of transaction ID and timestamp.

TransationLogTable=
    hash key: a transaction ID
    sort key: a unique timestamp for this record
    previous: the timestamp of the previous record in the log
    action: the operation that produced this record
    deferred: whether the action is immediate or deferred
    . . . : the arguments for this action, e.g. table name As the transaction ID is used as the hash key, the records for a given transaction are stored together. They are ordered within the log by their timestamps and linked into a list using the previous pointers. All log records are write-once, that is, they are never updated except for the record with a sort key of zero, which is called the log head.

The log head item contains the status of the transaction (active, committed, aborted, or completed) and it points to the latest log record for the transaction. To append a new log record, a new database item is written, and then the "previous" pointer in the log head is set to the timestamp of the new item. This write is a conditional put so that if the transaction has already committed or aborted then no new records can be added. Similarly, an attempt to change the transaction status to committed or aborted is conditional on the transaction not already being in one of these states.

The lock table contains an item for each object that is currently locked by a running transaction or that was recently written by a committed transaction. It can store locks for different types of entities, with the only requirement being that each entity must have a unique lock name which serves as the hash key.

LockTable=
    hash key: the lock name
    txid: the ID of the transaction holding this lock
    table write time: the commit_time of the previous table update
    data write time: the commit_time of the previous data update If the txid field is zero, then the lock is not currently held by an active transaction.

In some embodiments, partition b-trees are stored in a database table with each node of the b-tree being a unique item. Although the root and internal nodes of a b-tree contain very different information than the leaf nodes of the b-tree, both types of nodes can be stored in the same database table.

BtreeTable=
    hash key: a unique node ID
    timestamp: the create time for this b-tree
    branch keys: a set of branch keys (for root/internal nodes)
    branch pointers: a set of node IDs (for root/internal nodes)
    partition keys: a set of partition keys (for leaf nodes)
    data objects: a set of data objects (for leaf nodes)
    overflow: the ID of an overflow node if all data does not fit The timestamp in each node can be used to determine if the node is shared with a different b-tree. Specifically, when a b-tree is cloned, it gets a unique root node whose timestamp is set to the current time, but this root node points to the existing internal and leaf nodes from earlier partition trees. These nodes have timestamps that are earlier than that of the root node, which indicates that the nodes are shared. As updates are made to the cloned tree, shared nodes are replaced with new nodes that have the same timestamp as the root node.

The version history for a table in some embodiments is stored in a database as a one-way linked list. There is a unique item for each version of each table that contains a pointer to the root of the b-tree for that version.

VersionTable=
    hash key: the table name
    sort key: the commit_time of this version
    previous: the commit_time of the previous version
    latest read: read time of the latest query (for head node)
    b-tree: the node ID of the root of the b-tree
    discarded: true if this version has been deleted In some embodiments, all version history items are write-once, except when a version is marked as discarded and except for the special item with a sort key of zero, which is the version history head. The version history head item always points to the latest version of a table. It is conditionally updated when a new version is being added to the history. The new version is created as an item that points to the previously latest version, and then the version history head points to the new latest version.

Figure 8:
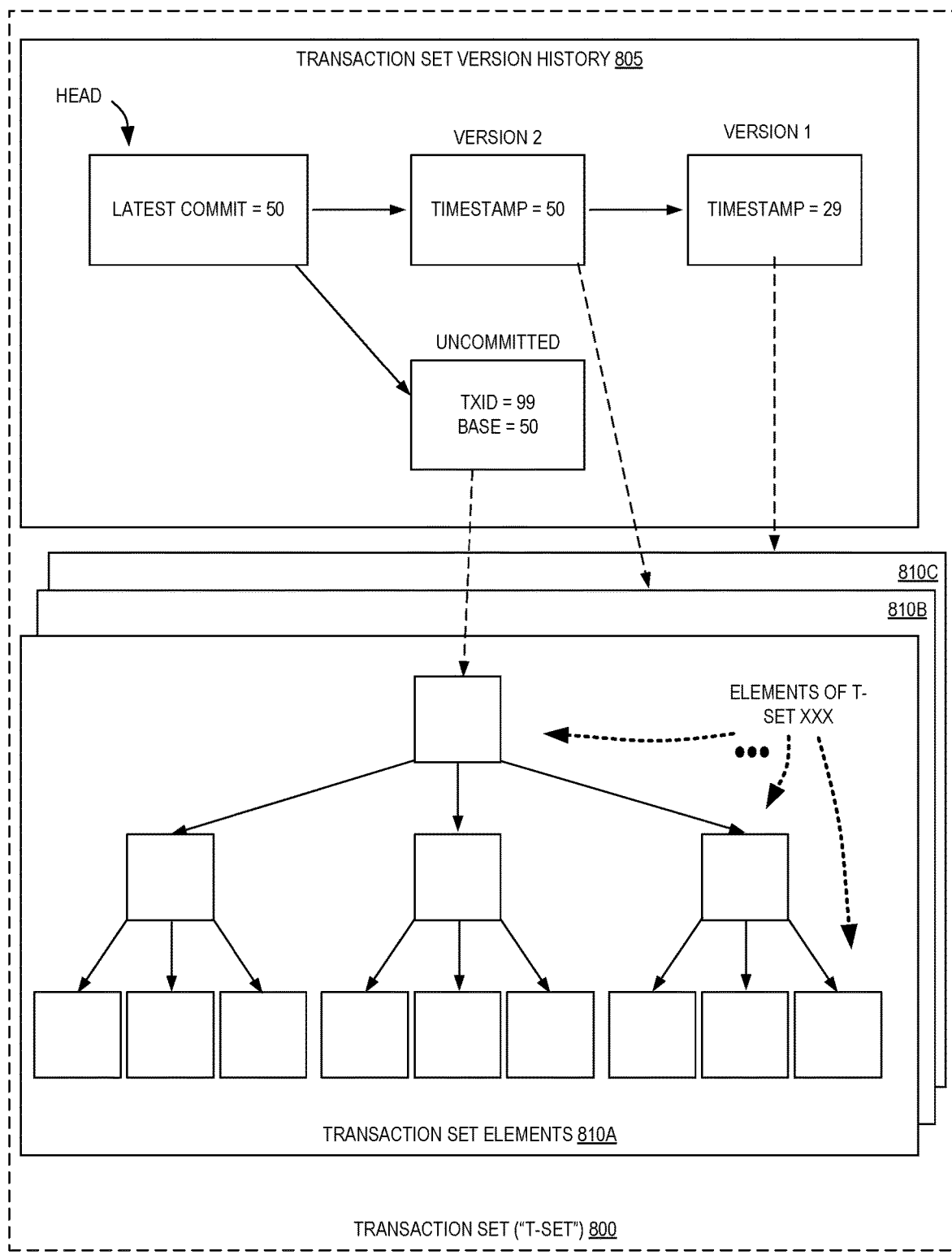
FIG. 8 is a diagram illustrating a transactional version set that serves as a fundamental abstraction for transactional access manager catalog metadata according to some embodiments.

FIG. 8 is a diagram illustrating a transactional version set 800 that serves as a fundamental abstraction for transactional access manager catalog metadata according to some embodiments.

A transactional version set (or "t-set") contains a collection of elements where each element includes an identifier and an associated collection of metadata. The identifier may be a string, and the metadata may be data such as a JSON object. A t-set is transactional in that a sequence of updates to one or more t-sets are made within an atomic transaction. Moreover, a t-set is versioned because each committed transaction that updates it produces a new timestamped version that can be accessed via time-travel queries. A t-set is a "set" in the sense that each identifier can appear at most once; attempts to add an element with the same identifier as an existing element will fail. A t-set is also ordered by the identifiers of its elements and supports retrieving ranges of set elements.

Updating a t-set may uses the transactional access manager transaction API, such as the following calls: BeginTransaction( ), CommitTransaction(txId), and AbortTransaction(txId). Additionally, FIG. 9 illustrates methods that could be used for creating, destroying, and updating a t-set: CreateSet(txId, setId, setMetadata), which creates a new set with optional metadata; DestroySet(txId, setId), which deletes the set; AddElement(txId, setId, elementId, elementMetadata), which adds an element to the set; RemoveElement(txId, setId, elementId), which removes an element from the set; AddSetElement(txId, parentId, childId), which adds a set element; UpdateSetMetadata(txId, setId, setMetadata), which updates the set's metadata; UpdateElementData(txId, setId, elementId, elementMetadata), which updates the element's metadata; GetElement(txId, setId, elementId, asof), which returns the associated metadata for the "asof" version; GetAllElements(txId, setId, asof), which returns all elements of the set for the "asof" version; GetRangeOfElements(txId, setId, minElementId, maxElementId, asof), which returns elements in the range.

Figure 10:
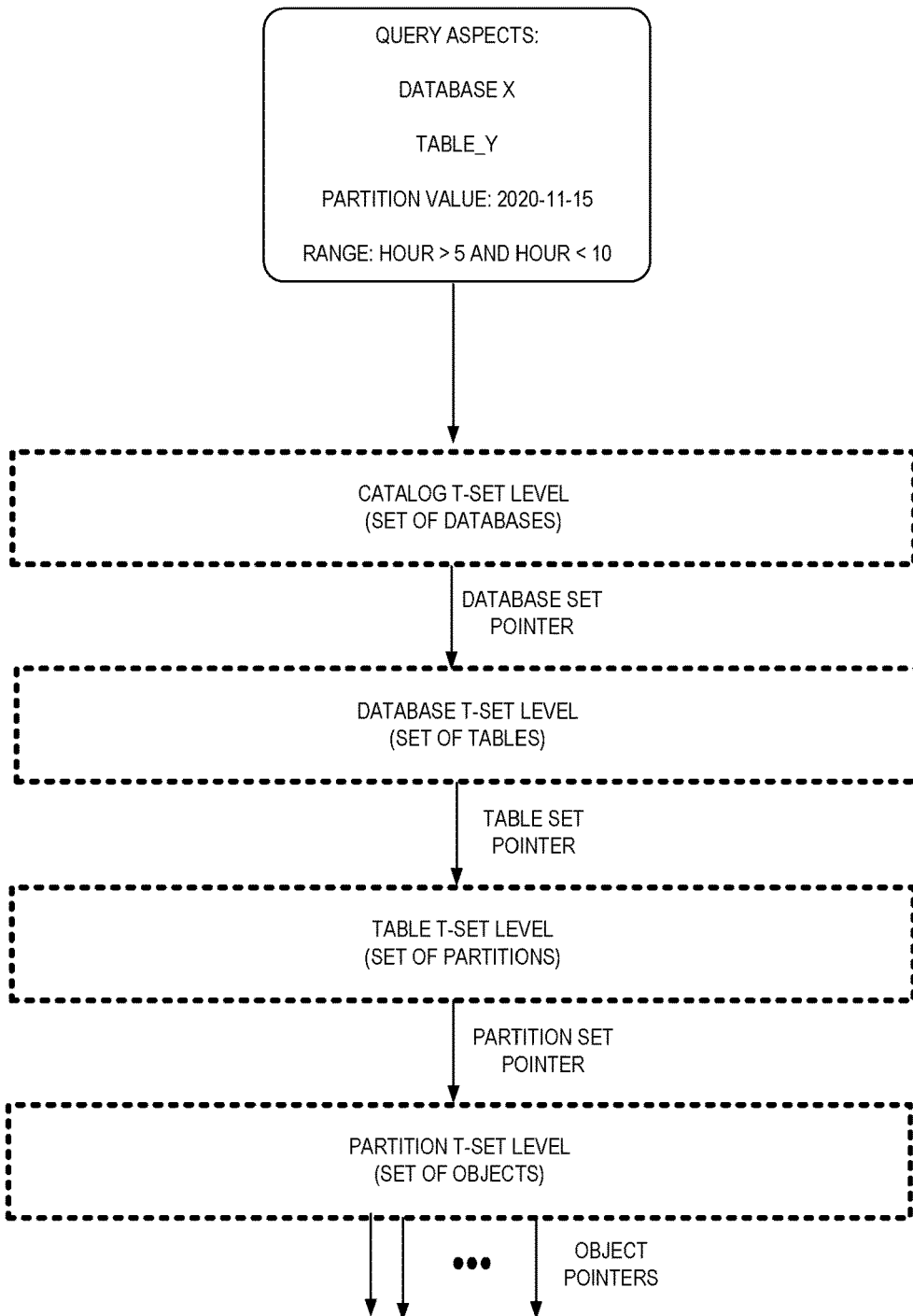
FIG. 10 is a diagram illustrating the use of hierarchical transactional version sets according to some embodiments.

In some embodiments, t-sets may be used in a hierarchical manner in a transactional access manager catalog. FIG. 10 is a diagram illustrating the use of hierarchical transactional version sets according to some embodiments. As shown in this example, multiple levels of t-sets can be used together—in this example, four levels, where a catalog is a set of databases, a database is a set of tables, a table is a set of partitions, and a partition is a set of data objects. Thusly, a query for a particular database of a catalog, to work upon a particular table of that database, and with a particular partition (e.g., date of "2020-11-15"), seeking a range of records (e.g., where an hour value is between 5 and 10) can involve accessing multiple levels of the hierarchy, e.g., a catalog t-set level (which may include a version history and one or more corresponding b-trees) to identify a database set pointer, then a database t-set level (which may include a version history and one or more corresponding b-trees) to identify a table set pointer, a table t-set level (which may include a version history and one or more corresponding b-trees) to identify a partition set pointer, and a partition t-set level (which may include a version history and one or more corresponding b-trees) to identify one or more objects pointers/references. It is to be understood that this example is indeed illustrative, and thus more, fewer, and/or different "levels" of a hierarchy could be used in different embodiments or implementations.

In some embodiments, the main operations of a transactional access manager type catalog can be translated into set operations:

CreateDatabase(catalogId, name, description, locationUri, . . . )—calls CreateSet for the database and then AddSetElement to add the database to the catalog UpdateDatabase(catalogId, name, newName, newDescription, newLocationUri, . . . )—calls UpdateSetMetadata for the database set DeleteDatabase(catalogId, name)—calls RemoveElement to remove the database from the catalog and DestroySet to delete the database from its version history GetDatabase(catalogId, name)—calls GetElement on the catalog set GetDatabases(catalogId, nextToken, maxResults, . . . )—calls GetAllElements on the catalog CreateTable(catalogId, databaseName, name, description, partitionKeys, . . . )—calls CreateSet and then AddSetElement UpdateTable(catalogId, databaseName, name, newDescription, newPartitionKeys, . . . )—calls UpdateSetMetadata DeleteTable(catalogId, databaseName, name)—calls RemoveElement and DestroySet BatchDeleteTable(catalogId, databaseName, tablesToDelete)—calls RemoveElement and DestroySet for each table in batch GetTable(catalogId, databaseName, name)—calls GetElement GetTables(catalogId, databaseName, expression, nextToken, maxResults)—calls GetAllElements GetTableVersion(catalogId, databaseName, tableName, versionId)—calls GetElement with an "as of" time GetTableVersions(catalogId, databaseName, tableName, nextToken, maxResults)—uses a GetVersions method in API DeleteTableVersion(catalogId, databaseName, tableName, versionId)—uses a DeleteVersion method BatchDeleteTableVersions(catalogId, databaseName, tableName, versionIds)—uses a DeleteVersion method SearchTables(catalogId, filters, searchText, sortCriteria, nextToken, maxResults, . . . )—calls GetAllElements CreatePartition(catalogId, databaseName, tableName, values, . . . )—calls CreateSet and AddSetElement BatchCreatePartition(catalogId, databaseName, tableName, partitionInputList)—calls CreateSet and AddSetElement for each partition in batch UpdatePartition(catalogId, databaseName, tableName, values, partitionInput)—calls UpdateSetMetadata DeletePartition(catalogId, databaseName, tableName, values)—calls RemoveElement and DestroySet BatchDeletePartition(catalogId, databaseName, tableName, partitionsToDelete)—calls RemoveElement and DestroySet for each partition in batch GetPartition(catalogId, databaseName, tableName, values)—calls GetElement GetPartitions(catalogId, databaseName, tableName, expression, nextToken, maxResults)—calls GetAllElements BatchGetPartition(catalogId, databaseName, tableName, partitionsToGet)—calls GetElement for each partition in batch BatchUpdatePartition(catalogId, databaseName, tableName, entries)—calls UpdateSetMetadata for each partition in batch Conflicting Updates Concurrently executing transactions may perform conflicting updates that result in one or both of the transactions being aborted. Calls that add and remove elements for the same t-set do not conflict as long as they are adding and removing different elements, even if performed by concurrent transactions. Also, updating the metadata for different elements is not a conflict. Nor is updating the metadata for one element while other elements are being added or removed. And, of course, calls to create two new sets are non-conflicting as long as the sets have different IDs, and creating a set does not conflict with operations on other sets.

There are several pairs of operations that do conflict if performed by concurrent transactions, and should result in one of the transactions being aborted:

CreateSet(tx1, sid1) vs. CreateSet(tx2, sid2) if sid1=sid2: Creating two sets with the same ID is a conflict, regardless of whether performed by concurrent or sequential transactions.

AddElement(tx1, sid, eid1) vs. AddElement(tx2, sid, eid2) if eid1=eid2: Adding elements with the same ID to the same set is a conflict, regardless of whether performed by concurrent or sequential transactions.

AddElement(tx1, sid, eid1) vs. AddSetElement(tx2, sid, csid2) if eid1=cid2: Adding elements with the same ID to the same set is a conflict, regardless of whether performed by concurrent or sequential transactions.

AddSetElement(tx1, sid, cid1) vs. AddSetElement(tx2, sid, cid2) if cid1=cid2: Adding child sets with the same ID to the same set is a conflict, regardless of whether performed by concurrent or sequential transactions.

UpdateElementData(tx1, sid, eid1) vs. UpdateElementData(tx2, sid, eid2) if eid1=eid2: Updating the metadata for an element in two concurrent transactions is a conflict.

UpdateSetMetadata(tx1, sid1) vs. UpdateSetMetadata(tx2, sid2) if sid1=sid2: Updating the metadata for a set in two concurrent transactions is a conflict.

AddElement(tx1, sid1, eid) vs. UpdateSetMetadata(tx2, sid2) if sid1=sid2: Adding an element to a set while another transaction is updating the metadata for that set is a conflict.

AddElement(tx1, sid1, eid) vs. DestroySet(tx2, sid2) if sid1=sid2: Adding an element to a set while another transaction is deleting that set is a conflict.

AddElement(tx1, sid1, eid) vs. DestroySet(tx2, sid2) if sid1=sid2: Adding an element to a set while another transaction is deleting that set is a conflict.

RemoveElement(tx1, sid1, eid) vs. UpdateSetMetadata(tx2, sid2) if sid1=sid2: Removing an element from a set while another transaction is updating the metadata for that set is a conflict.

RemoveElement(tx1, sid, eid1) vs. UpdateElementData(tx2, sid, eid2) if eid1=eid2: Removing an element from a set while another transaction is updating the metadata for that element is a conflict.

RemoveElement(tx1, sid1, eid) vs. DestroySet(tx2, sid2) if sid1=sid2: Removing an element from a set while another transaction is deleting that set is a conflict.

UpdateSetMetadata(tx1, sid1) vs. DestroySet(tx2, sid2) if sid1=sid2: Updating the metadata for a set while another transaction is deleting that set is a conflict.

AddElement(tx1, sid1, eid) vs. UpdateSetMetadata(tx2, sid2) if sid2=parent(sid1): Adding an element to a set while another transaction updates its parent set's metadata could be a conflict.

AddElement(tx1, sid1, eid) vs. UpdateSetMetadata(tx2, sid2) if sid2=parent(parent(sid1)): Adding an element to a set while another transaction updates its parent's parent set's metadata could be a conflict.

AddElement(tx1, sid1, eid) vs. RemoveElement(tx2, sid, sid2) if sid=parent(sid1) and sid1=sid2: Adding an element to a set while another transaction is removing that set from its parent set could be a conflict.

Performing any operation on a set while another transaction removes that set from its parent set could be a conflict. Note that if removing a set from its parent also destroys that set, then this is covered by the conflicts above for DestroySet operations.

For simplicity, in many embodiments the last examples of potential conflicts are not treated as conflicting unless it is determined, in the implementing system, that there are concrete scenarios in which they arise and for which aborting concurrent transactions would be beneficial.

Storage

When a t-set is created, a new item may be created in a database to hold its ID and metadata. The hash key for this item is derived from the ID of the set, and the sort key is a timestamp (or version number).

Each element of a t-set is stored as a database item. Additionally, the elements are organized in a b-tree that maps element IDs to element metadata. The b-tree structure supports the retrieval of ranges of elements.

Just as described earlier herein, when a transaction commits, a new version is created of each set that was updated within the transaction. The new version may be timestamped with the commit time of the transaction. Versions are linked to together into a list that is ordered by their commit times. A special head node points to the most recent version (by recording its timestamp) and this most recent version points to the previous version and so on. Each version has its own b-tree containing all of the members of the set at the given commit time. B-trees for different versions of the same set can share internal and leaf b-tree nodes but have unique root nodes.

To support "read your writes" within a transaction, uncommitted versions of t-sets for currently executing transactions are also attached to the version history. These uncommitted versions are transformed into committed versions when the transaction commits or are discarded if the transaction is aborted.

Each transaction has its own transaction log, which can be stored in a database as described herein. However, one change from the design above is that the operations on a t-set may be recorded in the log rather than the higher-level operations in the transactional access manager 102 API. Each call to the transactional access manager 102 API may result in one or more t-set operations (as discussed above).

The transaction post-commit and post-abort background processes understand the semantics of t-set operations but know nothing about the transactional access manager 102 API that is presented to users.

Isolation

The version history for a t-set contains enough information to allow conflicting operations to be detected at commit time without acquiring locks during the execution of a transaction. Avoiding locks is attractive since no lock table must be stored.

Abstractly, suppose that transaction Tx1 contains an operation Op1 that conflicts with operation Op2 in transaction Tx2, and suppose that Tx1 commits first. When Tx1 commits, it applies operation Op1 to produce a new version of the updated t-set, and it adds this to the t-set's version history along with the commit time of Tx1. Now, when Tx2 attempts to commit, the commit process obtains operation Op2 from the transaction log of Tx2 along with the start time of Tx2 and chooses a commit time. This commit process reads the head of the version history for the t-set being updated by Op2 and checks whether the latest commit for this t-set falls between the start and commit times of Tx2. If the latest version was written after Tx2 started, then a conflict is detected, and transaction Tx2 is aborted.

The fact that two AddElements on the same t-set do not conflict, yet they both produce new versions of the t-set, makes conflict detection a bit more complicated. In particular, the head node of a t-set's version history contains both the latest commit that added or removed an element, the membership commit time, and the latest commit that updated the t-set in some other way, the set commit time. Committing a transaction that includes an AddElement operation checks only the set commit time but not the membership commit time. Whereas all other operations in a transaction check both commit times in order to detect conflicts.

Figure 11:
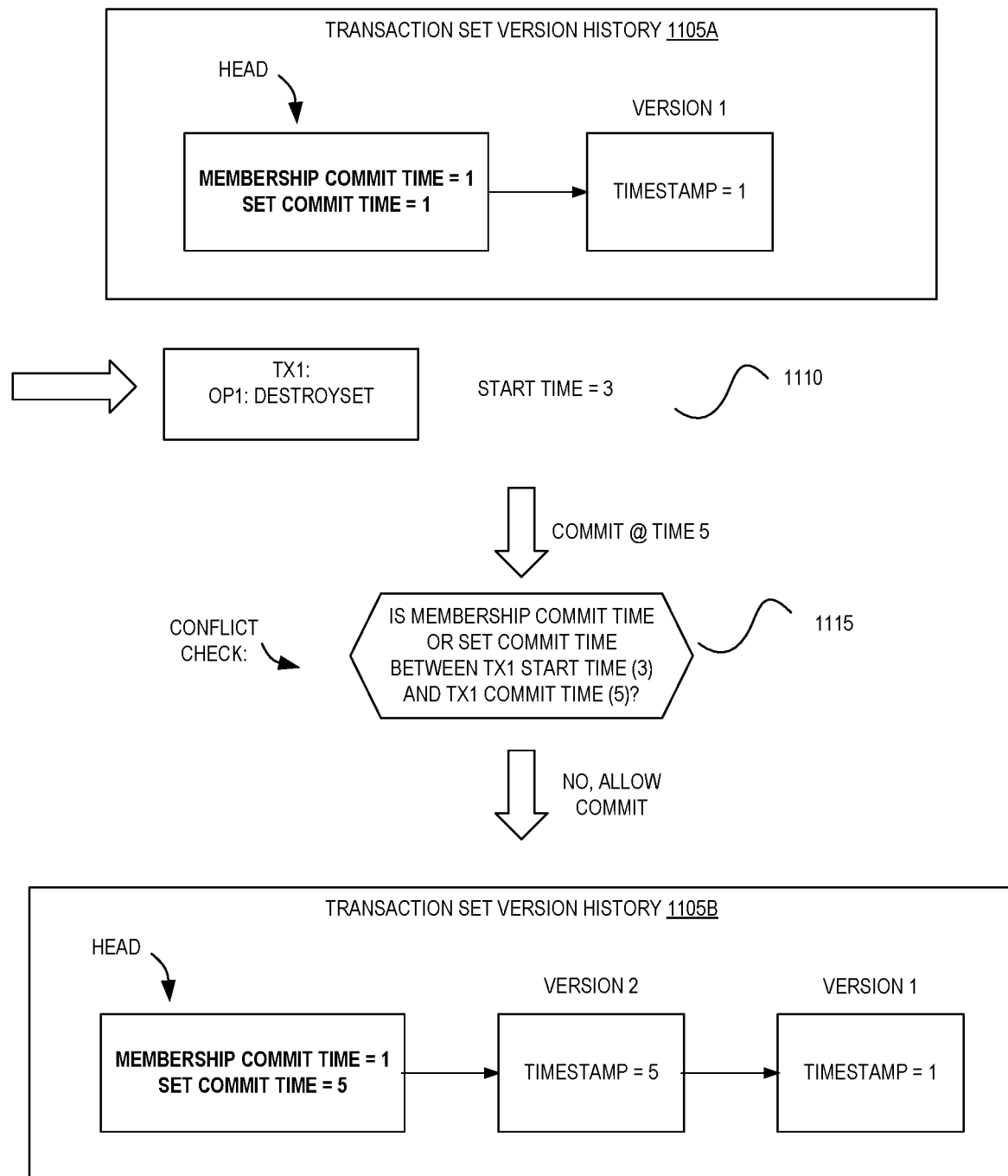
FIG. 11 is a diagram illustrating conflict checking with transactional version sets according to some embodiments.

As a concrete example, based on the prior abstract scenario, consider FIG. 11, which is a diagram illustrating conflict checking with transactional version sets according to some embodiments. In this example, we suppose that the version history of this t-set starts with a single version where both the membership and set commit times are 1. Then, suppose that transaction Tx1 includes Op1 that is a DestroySet operation 1110.

The log for Tx1 contains only Op1, the DestroySet operation. The commit process checks at decision block 1115 whether the version history's membership commit time or set commit time is between 3, Tx1's start time, and 5, Tx1's commit time. It is not, and so there is no conflict, and Tx1 is allowed to commit A new version is added to the version history of the deleted t-set which indicates that the t-set was destroyed at time 5. The version head indicates that the set commit time is 5 and the membership commit time is still 1.

Figure 12:
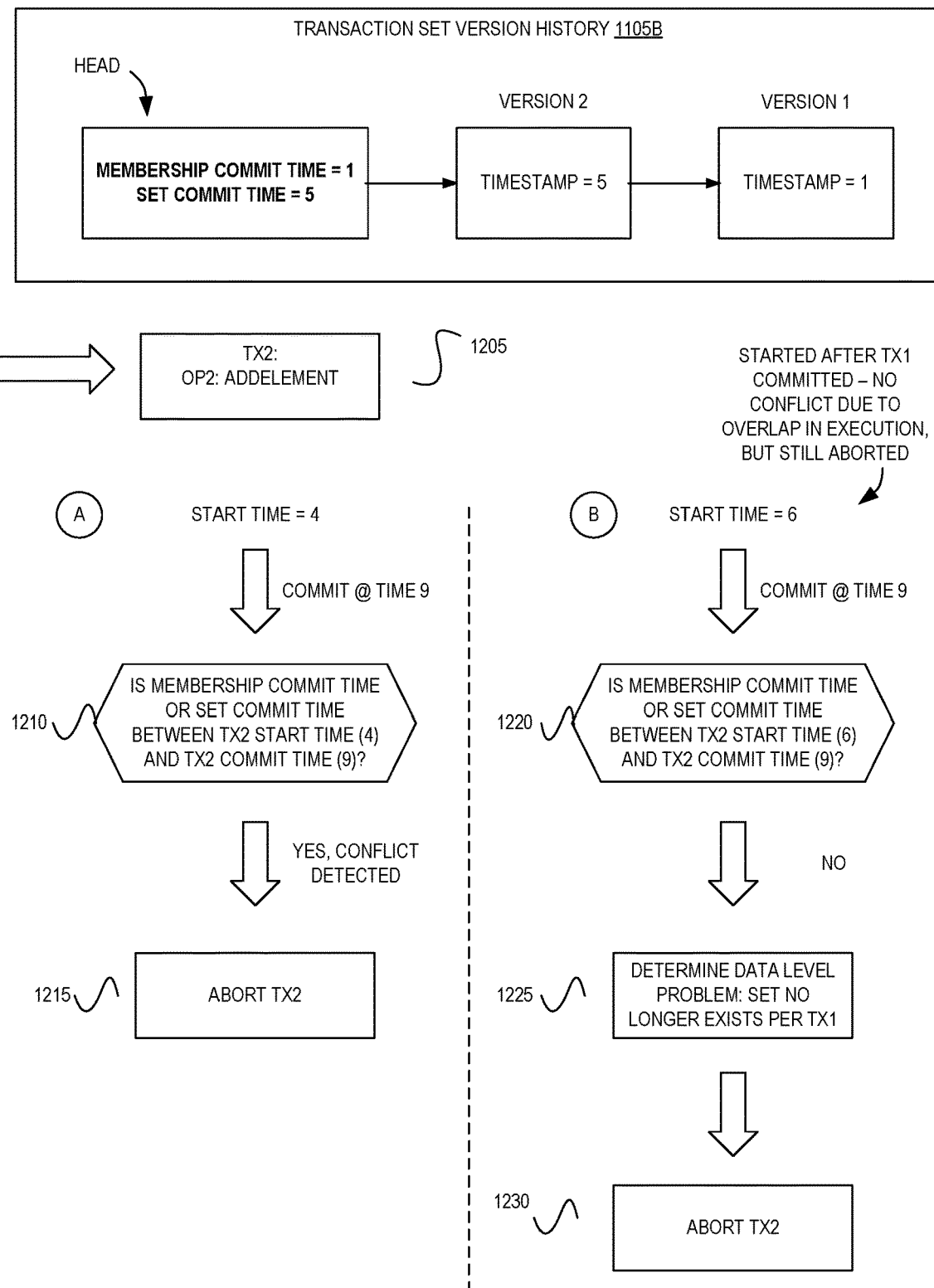
FIG. 12 is a diagram that continues FIG. 11 to illustrate conflict checking with transactional version sets according to some embodiments.

We now suppose, in FIG. 12, that Op2 is an AddElement operation 1205 for this same t-set. This operation clearly conflicts with Op 1 from Tx1. Supposing that Tx1 started at time 3, committed at time 5.

If, under circle (A), the start time for this transaction Tx2 started at time 4 and the commit process assigns a commit time of 9. In this case, there is one operation in the log for Tx2, the Op2 AddElement operation. The commit process reads the version head of the t-set to which the element is being added and discovers that its set commit time of 5 falls between Tx2's start time of 4 and its commit time of 9 as part of decision block 1210. Therefore, Op2 conflicts with some operation in a previously committed transaction, and Tx2 is aborted at block 1215.

However, if we suppose that, instead of starting at time 4, transaction Tx2 started at time 6 as reflected by circle (B)—i.e., Tx2 started after Tx1 committed. In this case, there would be no conflict since the two transaction do not overlap in execution—thus, decision block 1220 would determine that the commit times 1 and 5 are not between 6 and 9. However, Tx2 would still abort since its attempt to add an element to the t-set would fail because the t-set had been destroyed by Tx1—e.g., at block 1225 it is determined that a data-level problem exists in that the set no longer exists. As a result, the transaction is aborted at block 1230.

Early aborting, where a transaction detects a conflict before reaching the commit point is also possible in this scheme. At the time that an operation is submitted as part of a transaction, the same checks for conflicts can be performed as would be done during the commit process. If another transaction has already committed with a conflicting operation, then there is no benefit in continuing to execute the current transaction since it will be eventually aborted. To avoid adding delays to client calls, the conflict checking can be done in the background after control is returned to the caller.

Beneficially, the formulation of t-sets can provide a single abstraction that can be used by many different catalog operations, which can simplify the overall code of a system. Moreover, the details of atomicity (logging) and isolation (locking) can be uniformly implemented for all catalog entries.

Further, although for small sets—and those that do not require range lookups—creating and maintaining a b-tree could be overkill, and for tables with a single data object per partition, maintaining the table-to-partition-to-object mapping could result in overly expensive get operations, embodiments can avoid these issues with smart implementations that are hidden under the abstraction that perform operations such as coalescing multiple elements into a single database item, collapsing and/or expanding the hierarchy as needed, etc.

Figure 13:
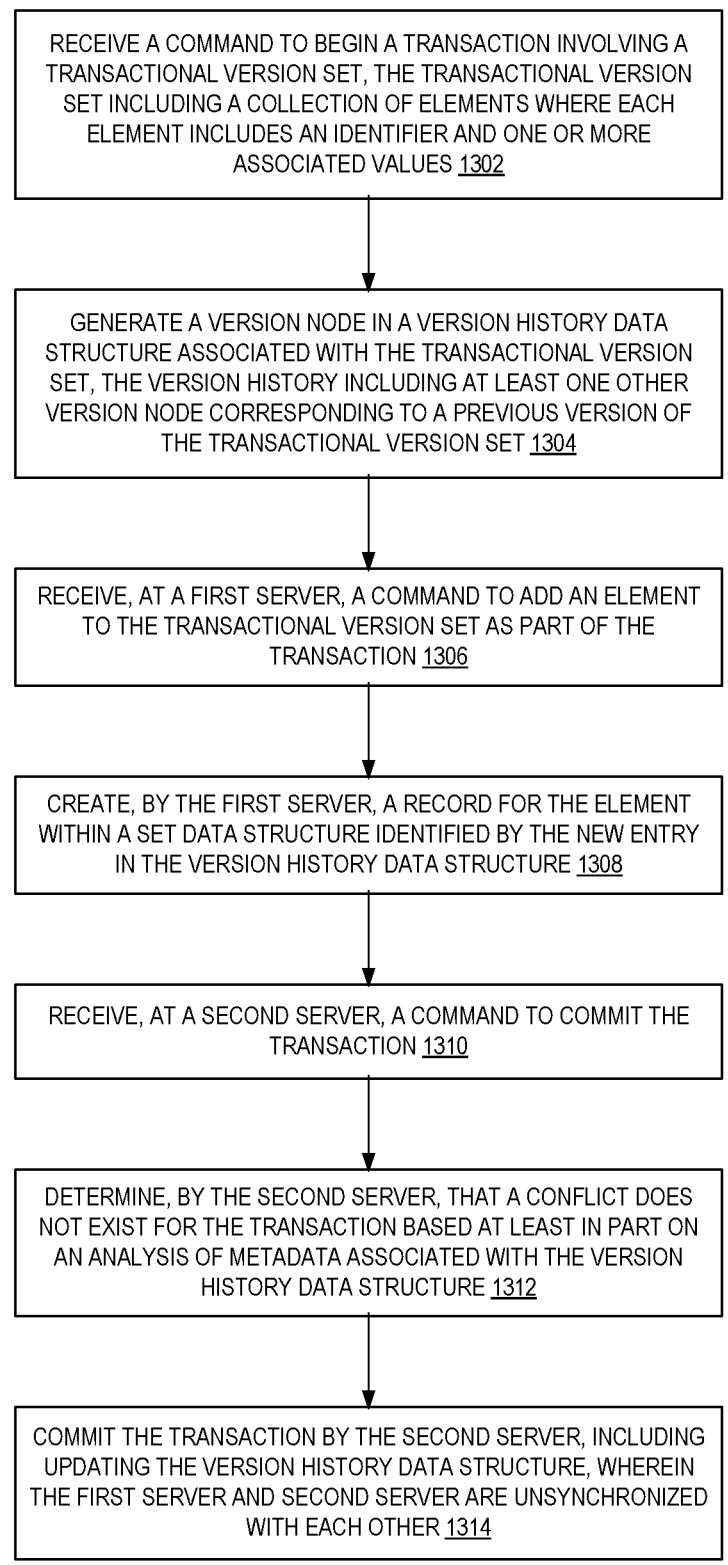
FIG. 13 is a flow diagram illustrating operations of a method for implementing a catalog using transactional version sets according to some embodiments.

FIG. 13 is a flow diagram illustrating operations 1300 of a method for implementing a catalog using transactional version sets according to some embodiments. Some or all of the operations 1300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1300 are performed by the transactional access manager 102 of the other figures.

The operations 1300 include, at block 1302, receiving a command to begin a transaction involving a transactional version set, the transactional version set including a collection of elements where each element includes an identifier and one or more associated values. The command may be received by a first server of a fleet of servers operating as part of the transactional access manager 102 of the other figures.

The operations 1300 further include, at block 1304, generating a version node in a version history data structure associated with the transactional version set, the version history including at least one other version node corresponding to a previous version of the transactional version set. The generating may be performed by the first server.

The operations 1300 further include, at block 1306, receiving a command to add an element to the transactional version set as part of the transaction, which may be performed by the first server or a second server, where the first server and the second server are unsynchronized with each other; and at block 1308, creating a record for the element within a set data structure identified by the new entry in the version history data structure. The creating of the record may be performed by the same server that performed block 1306. At block 1310, receiving a command to commit the transaction, which could be performed by the first server, second server, or even a third server of the fleet.

The operations 1300 further include, at block 1312, determining that a conflict does not exist for the transaction based at least in part on an analysis of metadata associated with the version history data structure. Block 1312 may be performed by the same server as performed block 1310. In some embodiments, block 1312 includes comparing a current commit time to one or more commit times from the metadata of the version history, wherein the one or more commit times includes at least one of: a set commit time comprising a time of a latest commit that added an element to or removed an element from the transactional version set; or a membership commit time comprising a time of a latest commit that updated the transactional version set in a manner different than adding or removing an element. In some embodiments, the version history data structure includes a head node and a plurality of version nodes; the head node includes the one or more commit times and a reference to one of the plurality of version nodes that is most recently committed; the plurality of version nodes include the version node and the at least one other version node; and ones of the plurality of version nodes include a reference to a previous version node that was previously most recently committed.

The operations 1300 further include, at block 1314, committing the transaction, wherein the committing includes updating the version history data structure. Block 1314 may be performed by the same server that performed blocks 1310 and 1312. In some embodiments, the entirety of the transaction is performed without acquiring any locks associated with the transactional version set.

In some embodiments, block 1304 includes generating the version node as an uncommitted version; and block 1314 includes transforming the uncommitted version into a committed version.

The operations 1300, in some embodiments, further include receiving a query to be executed using the transactional version set, wherein the query includes or is associated with a time value indicating a point in time of the transactional version set that the query is to be executed using; identifying, based on the time value, a second version node within the version history data structure as being associated with a second set data structure that represents the point in time of the transactional version set; and executing the query using a second set data structure identified by the second version node. In some embodiments, the query seeks information within a specified range of values; and the second set data structure comprises a tree data structure.

In some embodiments, the transactional version set represents one of: a set of databases; a set of tables; a set of partitions; or a set of data objects. The operations 1300, in some embodiments, further include maintaining a hierarchy of transactional version sets, wherein the hierarchy includes at least the transactional version set and a second transactional version set, wherein each transactional version set of the hierarchy represents a different one of a set of databases, a set of tables, a set of partitions, or a set of data objects.

In some embodiments, the one or more associated values for each element comprise one or more storage locations of one or more data objects associated with the element.

FIG. 14 is a flow diagram illustrating operations 1400 of a method for providing transactional access to a data lake with snapshot isolation using a version history data structure and tree data structures according to some embodiments. Some or all of the operations 1400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1400 are performed by the transactional access manager 102 of the other figures.

The operations 1400 include, at block 1402, receiving a request to commit a transaction, wherein the transaction includes an update to data of a first table.

At block 1404, the operations 1400 include generating, based on a first tree data structure storing metadata associated with a first version of the first table, a second tree data structure associated with a second version of the first table resulting from the transaction being performed upon the first version, wherein the first tree data structure and the second tree data structure each include one or more nodes that do not exist in the other data structure, and wherein the second tree data structure references one or more nodes of the first tree data structure.

The operations 1400 include, at block 1406, updating a version history data structure associated with the first table to include a second version node associated with the second version, wherein the second version node references the second tree data structure and further references a first version node associated with the first version.

In some embodiments, the version history data structure further includes a third version node associated with a third version of the first table corresponding to an earlier point in time than either the first version or the second version, wherein the third version node references a third tree data structure; and the first tree data structure and the second tree data structure each have fewer or different nodes than the third tree data structure.

The operations 1400, in some embodiments, further include receiving a query to be executed using the first table, wherein the query includes or is associated with a time value indicating a point in time of the first table that the query is to be executed against; identifying the second version node within the version history data structure based on use of the time value and a commit time value of the second version node; and executing the query using the second tree data structure referenced by the second version node. In some embodiments, the query seeks information within a specified range of values.

In some embodiments, the generating of the second tree data structure occurs prior to the receiving of the request to commit the transaction. In some embodiments, the updating of the version history data structure associated with the first table to include the second version node associated with the second version occurs prior to the receiving of the request to commit the transaction and includes setting a status of the second version node to be uncommitted. The operations 1400, in some embodiments, further include receiving a query to be executed using the first table as part of the transaction; identifying the second version node based on use of a transaction identifier; and executing the query using the second tree data structure referenced by the second version node. The operations 1400, in some embodiments, further include updating, as part of a transaction commit process, the status of the second version node to be committed.

In some embodiments, the generating of the second tree data structure occurs after the receiving of the request to commit the transaction.

The operations 1400, in some embodiments, further include receiving a second request to commit a second transaction including an update to data of the first table; determining, as part of a commit process for the second transaction, that a third transaction involving the first table was committed after the start of the second transaction, wherein the third transaction is associated with a third version node of the version history data structure that references a third tree data structure; generating a fourth tree data structure based on the third tree data structure, the generating including reapplying updates from a transaction log to the third tree data structure; and updating the version history data structure associated with the first table to include a fourth version node, wherein the fourth version node references the fourth tree data structure and further references the third version node.

In some embodiments, the second tree data structure comprises a b-tree data structure that maps one or more partition keys to identifiers of data objects or data object storage locations.

In some embodiments, the transaction includes updates to data of the table and of a second table, and the operations 1400 further include, via an atomic procedure, along with the updating of the version history data structure associated with the first table, also updating a second version history data structure associated with the second table to include a third version node, wherein the third version node references a third tree data structure and further references a fourth version node of the second version history data structure.

Figure 15:
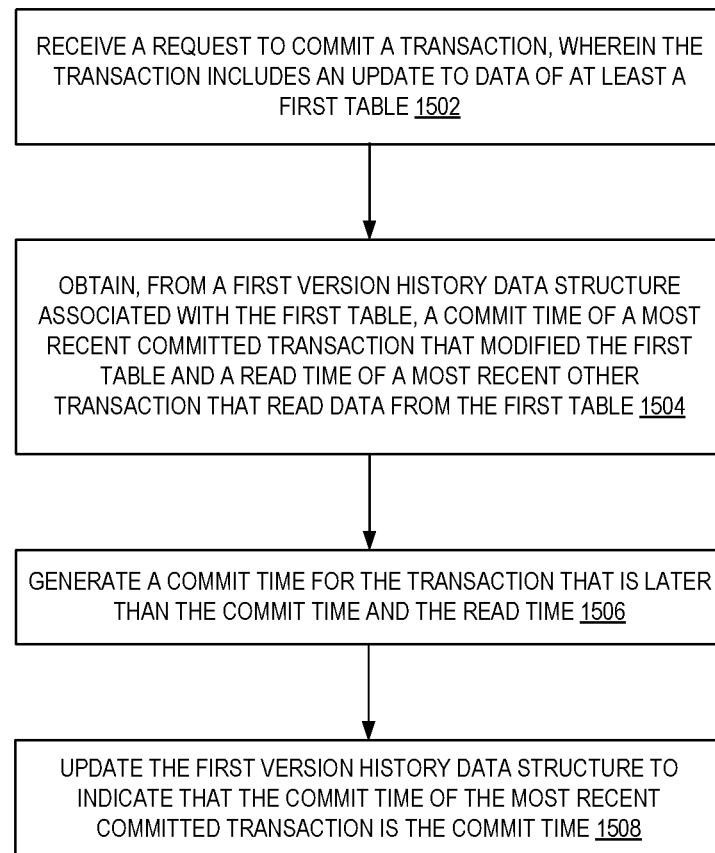
FIG. 15 is a flow diagram illustrating operations of a method for providing transactional access to a data lake using a protocol according to some embodiments.

FIG. 15 is a flow diagram illustrating operations 1500 of a method for providing transactional access to a data lake using a protocol according to some embodiments. Some or all of the operations 1500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1500 are performed by the transactional access manager 102 of the other figures.

The operations 1500 include, at block 1502, receiving a request to commit a transaction, wherein the transaction includes an update to data of at least a first table; and at block 1504, obtaining, from a first version history data structure associated with the first table, a commit time of a most recent committed transaction that modified the first table and a read time of a most recent other transaction that read data from the first table.

The operations 1500 further include, at block 1506, generating a commit time for the transaction that is later than the commit time and the read time; and at block 1508, updating the first version history data structure to indicate that the commit time of the latest committed transaction is the commit time.

The operations 1500, in some embodiments, further include receiving a request to add a data object to the first table as part of a second transaction; obtaining a lock table entry for the data object; determining that a lock does not currently exist for the data object; determining that the data object was part of a commit that occurred after the start of the second transaction; and aborting the addition of the data object to the first table.

The operations 1500, in some embodiments, further include receiving a request to delete a first table as part of a second transaction; obtaining a lock table entry for the first table; determining that a lock does not currently exist for the data object; determining that a change to the first table did not occur after the start of the second transaction; determining that a change to at least one data object referenced by the first table was committed after the start of the second transaction; and aborting the deletion of the first table.

The operations 1500, in some embodiments, further include receiving a request to perform a query involving the first table, wherein the query is a part of the transaction; determining (e.g., using the first version history data structure) that an uncommitted version of the first table associated with the transaction does not exist; selecting (e.g., using the first version history data structure) a version of the first table having a first commit time previous to a read time associated with the query; and executing the query using the selected version of the first table. The operations 1500, in some embodiments, further include determining that the version of the first table has a commit time prior to the read time; determining that the version of the first table has a last read time prior to the read time; and updating the last read time associated with the version of the first table to be the read time.

The operations 1500, in some embodiments, further include receiving a request to perform a query involving the first table, wherein the query is a part of the transaction; determining (e.g., using the first version history data structure) that an uncommitted version of the first table associated with the transaction does exist; and executing the query using the uncommitted version of the first table.

The operations 1500, in some embodiments, further include obtaining a plurality of log records associated with the transaction; and determining that a lock is held that is associated with the transaction for each of a plurality of data objects being written within the transaction.

The operations 1500, in some embodiments, further include obtaining, based on a second version history data structure associated with a second table, a second commit time of a most recent committed transaction that modified the second table and a second read time of a most recent other transaction that read data from the second table; wherein generating a commit time is based on an analysis of a local clock time, a start time of the transaction within a transaction log, the commit time; the read time; the second commit time; and the second read time.

The operations 1500, in some embodiments, further include updating the first version history data structure to change an uncommitted version of the first table, generated by the transaction, to be a committed version.

The operations 1500, in some embodiments, further include receiving a command to begin the transaction; assigning, within a record of a transaction log, a read time for the transaction; and processing a plurality of queries of the transaction that involve the first table using the read time for the transaction to select a version of the first table, via the first version history data structure, having a commit timestamp that is most recent in time prior to the read time.

Figure 16:
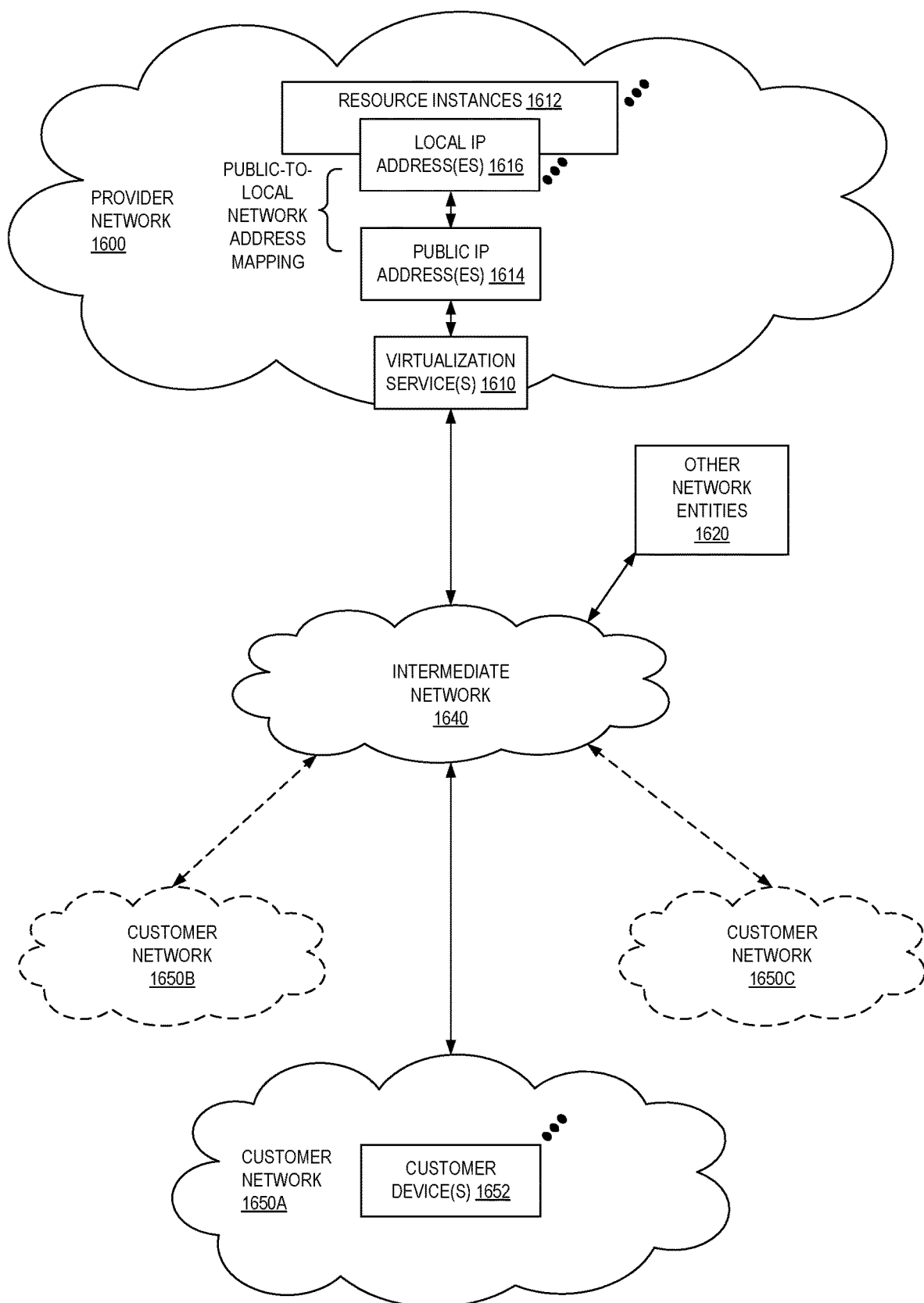
FIG. 16 illustrates an example provider network environment according to some embodiments.

FIG. 16 illustrates an example provider network (or "service provider system") environment according to some embodiments. A provider network 1600 may provide resource virtualization to customers via one or more virtualization services 1610 that allow customers to purchase, rent, or otherwise obtain instances 1612 of virtualized resources, including but not limited to computation and storage resources, implemented on devices within the provider network or networks in one or more data centers. Local Internet Protocol (IP) addresses 1616 may be associated with the resource instances 1612; the local IP addresses are the internal network addresses of the resource instances 1612 on the provider network 1600. In some embodiments, the provider network 1600 may also provide public IP addresses 1614 and/or public IP address ranges (e.g., Internet Protocol version 4 (IPv4) or Internet Protocol version 6 (IPv6) addresses) that customers may obtain from the provider 1600.

Conventionally, the provider network 1600, via the virtualization services 1610, may allow a customer of the service provider (e.g., a customer that operates one or more client networks 1650A-1650C including one or more customer device(s) 1652) to dynamically associate at least some public IP addresses 1614 assigned or allocated to the customer with particular resource instances 1612 assigned to the customer. The provider network 1600 may also allow the customer to remap a public IP address 1614, previously mapped to one virtualized computing resource instance 1612 allocated to the customer, to another virtualized computing resource instance 1612 that is also allocated to the customer. Using the virtualized computing resource instances 1612 and public IP addresses 1614 provided by the service provider, a customer of the service provider such as the operator of customer network(s) 1650A-1650C may, for example, implement customer-specific applications and present the customer's applications on an intermediate network 1640, such as the Internet. Other network entities 1620 on the intermediate network 1640 may then generate traffic to a destination public IP address 1614 published by the customer network(s) 1650A-1650C; the traffic is routed to the service provider data center, and at the data center is routed, via a network substrate, to the local IP address 1616 of the virtualized computing resource instance 1612 currently mapped to the destination public IP address 1614. Similarly, response traffic from the virtualized computing resource instance 1612 may be routed via the network substrate back onto the intermediate network 1640 to the source entity 1620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1600; a customer may then assign their allocated public IP addresses to particular resource instances allocated to the customer. These public IP addresses may be referred to as customer public IP addresses, or simply customer IP addresses. Instead of being assigned by the provider network 1600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 17:
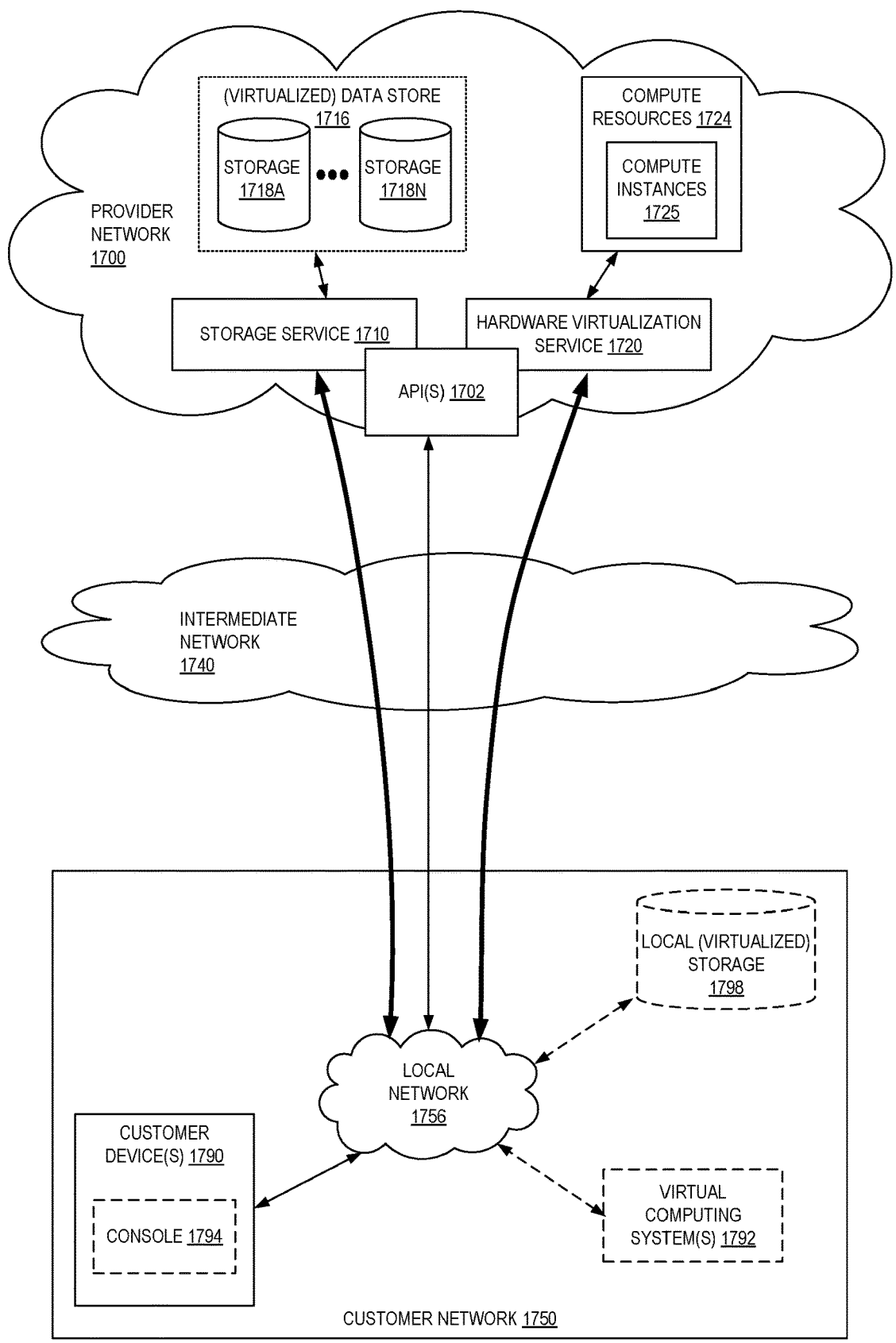
FIG. 17 is a block diagram of an example provider network that provides a storage service and a hardware virtualization service to customers according to some embodiments.

FIG. 17 is a block diagram of an example provider network that provides a storage service and a hardware virtualization service to customers, according to some embodiments. Hardware virtualization service 1720 provides multiple compute resources 1724 (e.g., compute instances 1725 such as VMs) to customers. The compute resources 1724 may, for example, be rented or leased to customers of the provider network 1700 (e.g., to a customer that implements customer network 1750). Each computation resource 1724 may be provided with one or more local IP addresses. Provider network 1700 may be configured to route packets from the local IP addresses of the compute resources 1724 to public Internet destinations, and from public Internet sources to the local IP addresses of compute resources 1724.

Provider network 1700 may provide a customer network 1750, for example coupled to intermediate network 1740 via local network 1756, the ability to implement virtual computing systems 1792 via hardware virtualization service 1720 coupled to intermediate network 1740 and to provider network 1700. In some embodiments, hardware virtualization service 1720 may provide one or more APIs 1702, for example a web services interface, via which a customer network 1750 may access functionality provided by the hardware virtualization service 1720, for example via a console 1794 (e.g., a web-based application, standalone application, mobile application, etc.). In some embodiments, at the provider network 1700, each virtual computing system 1792 at customer network 1750 may correspond to a computation resource 1724 that is leased, rented, or otherwise provided to customer network 1750.

From an instance of a virtual computing system 1792 and/or another customer device 1790 (e.g., via console 1794), the customer may access the functionality of storage service 1710, for example via one or more APIs 1702, to access data from and store data to storage resources 1718A-1718N of a virtual data store 1716 (e.g., a folder or "bucket", a virtualized volume, a database, etc.) provided by the provider network 1700. In some embodiments, a virtualized data store gateway (not shown) may be provided at the customer network 1750 that may locally cache at least some data, for example frequently-accessed or critical data, and that may communicate with storage service 1710 via one or more communications channels to upload new or modified data from a local cache so that the primary store of data (virtualized data store 1716) is maintained. In some embodiments, a user, via a virtual computing system 1792 and/or on another customer device 1790, may mount and access virtual data store 1716 volumes via storage service 1710 acting as a storage virtualization service, and these volumes may appear to the user as local (virtualized) storage 1798.

While not shown in FIG. 17, the virtualization service(s) may also be accessed from resource instances within the provider network 1700 via API(s) 1702. For example, a customer, appliance service provider, or other entity may access a virtualization service from within a respective virtual network on the provider network 1700 via an API 1702 to request allocation of one or more resource instances within the virtual network or within another virtual network.

Illustrative Systems

Figure 18:
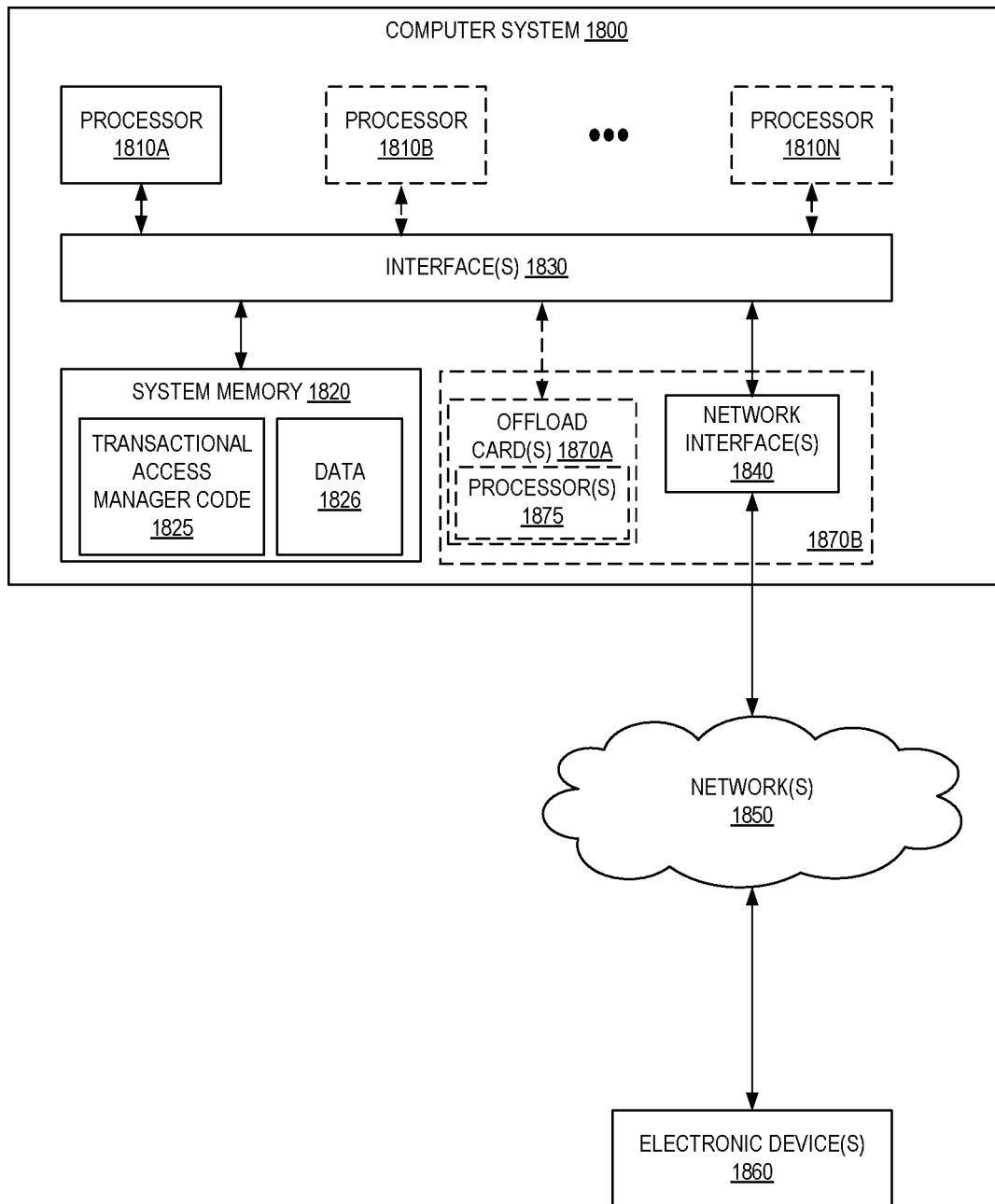
FIG. 18 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1800 illustrated in FIG. 18. In the illustrated embodiment, computer system 1800 includes one or more processors 1810 coupled to a system memory 1820 via an input/output (I/O) interface 1830. Computer system 1800 further includes a network interface 1840 coupled to I/O interface 1830. While FIG. 18 shows computer system 1800 as a single computing device, in various embodiments a computer system 1800 may include one computing device or any number of computing devices configured to work together as a single computer system 1800.

In various embodiments, computer system 1800 may be a uniprocessor system including one processor 1810, or a multiprocessor system including several processors 1810 (e.g., two, four, eight, or another suitable number). Processors 1810 may be any suitable processors capable of executing instructions. For example, in various embodiments, processors 1810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1810 may commonly, but not necessarily, implement the same ISA.

System memory 1820 may store instructions and data accessible by processor(s) 1810. In various embodiments, system memory 1820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1820 as transactional access manager code 1825 (e.g., executable to implement, in whole or in part, the transactional access manager 102) and data 1826.

In one embodiment, I/O interface 1830 may be configured to coordinate I/O traffic between processor 1810, system memory 1820, and any peripheral devices in the device, including network interface 1840 or other peripheral interfaces. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to system memory 1820, may be incorporated directly into processor 1810.

Network interface 1840 may be configured to allow data to be exchanged between computer system 1800 and other devices 1860 attached to a network or networks 1850, such as other computer systems or devices as illustrated in FIG. 1, for example. In various embodiments, network interface 1840 may support communication via any suitable wired or wireless general data networks, such as types of Ethernet network, for example. Additionally, network interface 1840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1800 includes one or more offload cards 1870A or 1870B (including one or more processors 1875, and possibly including the one or more network interfaces 1840) that are connected using an I/O interface 1830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1800 may act as a host electronic device (e.g., operating as part of a hardware virtualization service) that hosts compute resources such as compute instances, and the one or more offload cards 1870A or 1870B execute a virtualization manager that can manage compute instances that execute on the host electronic device. As an example, in some embodiments the offload card(s) 1870A or 1870B can perform compute instance management operations such as pausing and/or un-pausing compute instances, launching and/or terminating compute instances, performing memory transfer/copying operations, etc. These management operations may, in some embodiments, be performed by the offload card(s) 1870A or 1870B in coordination with a hypervisor (e.g., upon a request from a hypervisor) that is executed by the other processors 1810A-1810N of the computer system 1800. However, in some embodiments the virtualization manager implemented by the offload card(s) 1870A or 1870B can accommodate requests from other entities (e.g., from compute instances themselves), and may not coordinate with (or service) any separate hypervisor.

In some embodiments, system memory 1820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1800 via I/O interface 1830. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 1800 as system memory 1820 or another type of memory. Further, a computer-accessible medium may include transmission media or signals such as electrical, electromagnetic, or digital signals, conveyed via a communication medium such as a network and/or a wireless link, such as may be implemented via network interface 1840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1718A-1718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to commit a transaction, wherein the transaction includes an update to at least a first table and a second table;
   obtaining, based on a first version history data structure associated with the first table, a first commit time of a most recent committed transaction that modified the first table and a first read time indicative of a start time of a most recent other transaction that read from the first table;
   obtaining, based on a second version history data structure associated with the second table, a second commit time of a most recent committed transaction that modified the second table and a second read time indicative of a start time of a most recent other transaction that read from the second table;
   generating a commit time for the transaction based at least in part on the first commit time, the second commit time, the first read time and the second read time, the generated commit time to be later than the first commit time, the first read time, the second commit time, and the second read time; and
   updating the first commit time and the second commit time to be the generated commit time.

2. The computer-implemented method of claim 1, further comprising:
   receiving a request to perform a query involving the first table, wherein the query is a part of the transaction;
   determining, via use of the first version history data structure, that an uncommitted version of the first table associated with the transaction does not exist;
   selecting, via use of the first version history data structure, a version of the first table having a commit time previous to a read time associated with the query; and
   executing the query using the selected version of the first table.

3. The computer-implemented method of claim 1, further comprising:
   receiving a request to perform a query involving the first table, wherein the query is a part of the transaction;
   determining, via use of the first version history data structure, that an uncommitted version of the first table associated with the transaction does exist; and
   executing the query using the uncommitted version of the first table.

4. A computer-implemented method comprising:
   receiving a request to commit a transaction, wherein the transaction includes an update to data of at least a first table;
   obtaining, from a first version history data structure associated with the first table, a commit time of a most recent committed transaction that modified the first table and a read time of a most recent other transaction that read from the first table;
   generating a commit time for the transaction that is based at least in part on, and is later than the commit time of the most recent committed transaction that modified the first table and the read time of the most recent other transaction that read from the first table; and
   updating the first version history data structure to indicate that the commit time of the most recent committed transaction is the generated commit time.

5. The computer-implemented method of claim 4, further comprising:
   receiving a request to add a data object to the first table as part of a second transaction;
   obtaining a lock table entry for the data object;
   determining that a lock does not currently exist for the data object;
   determining that the data object was part of a commit that occurred after the start of the second transaction; and
   aborting the addition of the data object to the first table.

6. The computer-implemented method of claim 4, further comprising:
   receiving a request to delete the first table as part of a second transaction;
   obtaining a lock table entry for the first table;
   determining that a change to the first table did not occur after the start of the second transaction;

determining that a change to at least one data object referenced by the first table was committed after the start of the second transaction; and aborting the deletion of the first table.

7. The computer-implemented method of claim 4, further comprising:

receiving a request to perform a query involving the first table, wherein the query is a part of the transaction;

determining, using the first version history data structure, that an uncommitted version of the first table associated with the transaction does not exist;

selecting, using the first version history data structure, a version of the first table having a first commit time previous to a read time associated with the query; and executing the query using the selected version of the first table.

8. The computer-implemented method of claim 7, further comprising:

determining that the version of the first table has a commit time prior to the read time;

determining that the version of the first table has a last read time prior to the read time; and updating the last read time associated with the version of the first table to be the read time.

9. The computer-implemented method of claim 4, further comprising:

receiving a request to perform a query involving the first table, wherein the query is a part of the transaction;

determining that an uncommitted version of the first table associated with the transaction does exist; and executing the query using the uncommitted version of the first table.

10. The computer-implemented method of claim 4, further comprising:

obtaining a plurality of log records associated with the transaction; and determining that a lock is held that is associated with the transaction for each of a plurality of data objects being written within the transaction.

11. The computer-implemented method of claim 4, further comprising:

obtaining, based on a second version history data structure associated with a second table, a second commit time of a most recent committed transaction that modified the second table and a second read time of a most recent other transaction that read from the second table;

wherein generating the commit time is based on an analysis of:

a local clock time;

a start time of the transaction within a transaction log;

the commit time of the most recent committed transaction that modified the first table;

the read time of the most recent other transaction that read from the first table;

the second commit time; and the second read time.

12. The computer-implemented method of claim 4, further comprising:

updating the first version history data structure to change an uncommitted version of the first table, generated by the transaction, to be a committed version.

13. The computer-implemented method of claim 4, further comprising:

receiving a command to begin the transaction;

assigning, within a record of a transaction log, a read time for the transaction; and processing a plurality of queries of the transaction that involve the first table using the read time for the transaction to select a version of the first table, via the first version history data structure, having a commit timestamp that is most recent in time prior to the read time.

14. A system comprising:

a first one or more electronic devices to implement a first service in a multi-tenant provider network to store data objects; and a second one or more electronic devices to implement a second service in the multi-tenant provider network, the second one or more electronic devices storing instructions that upon execution by one or more processors of the second one or more electronic device cause the second service to:

receive a request to commit a transaction, wherein the transaction includes an update to data of at least a first table, wherein the data is stored by the first service;

obtain, based on a first version history data structure associated with the first table, a commit time of a most recent committed transaction that modified the first table and a read time of a most recent other transaction that read from the first table;

generate a commit time for the transaction that is based at least in part on, and is later than the commit time of the most recent committed transaction that modified the first table and the read time of the most recent other transaction that read from the first table; and update the first version history data structure to indicate that the commit time of the most recent committed transaction is the generated commit time.

15. The system of claim 14, wherein the second service further includes instructions that upon execution cause the second service to:

receive a request to add a data object to the first table as part of a second transaction;

obtain a lock table entry for the data object;

determine that a lock does not currently exist for the data object;

determine that the data object was part of a commit that occurred after the start of the second transaction; and abort the addition of the data object to the first table.

16. The system of claim 14, wherein the second service further includes instructions that upon execution cause the second service to:

receive a request to delete the first table as part of a second transaction;

obtain a lock table entry for the first table;

determine that a change to the first table did not occur after the start of the second transaction;

determine that a change to at least one data object referenced by the first table was committed after the start of the second transaction; and abort the deletion of the first table.

17. The system of claim 14, wherein the second service further includes instructions that upon execution cause the second service to:

receive a request to perform a query involving the first table, wherein the query is a part of the transaction;

determine that an uncommitted version of the first table associated with the transaction does not exist;

select a version of the first table having a first commit time previous to a read time associated with the query; and execute the query using the selected version of the first table.

18. The system of claim 17, wherein the second service further includes instructions that upon execution cause the second service to:
   determine that the version of the first table has a commit time prior to the read time;
   determine that the version of the first table has a last read time prior to the read time; and
   update the last read time associated with the version of the first table to be the read time.

19. The system of claim 14, wherein the second service further includes instructions that upon execution cause the second service to:
   receive a request to perform a query involving the first table, wherein the query is a part of the transaction;
   determine that an uncommitted version of the first table associated with the transaction does exist; and
   execute the query using the uncommitted version of the first table.

20. The system of claim 14, wherein to determine that the transaction includes an update to data of at least the first table the second service is to at least determine that the transaction includes an update to data of the first table and a second table, wherein the second service further include instructions that upon execution cause the second service to:
   obtain a plurality of log records associated with the transaction; and
   determine that a lock is held that is associated with the transaction for each of a plurality of data objects being written within the transaction.

\* \* \* \* \*